United States Patent
Todaka

(10) Patent No.: US 8,120,794 B2
(45) Date of Patent: Feb. 21, 2012

(54) DATA-PROCESSING DEVICE, DATA-PROCESSING METHOD, AND COMPUTER PROGRAM

(75) Inventor: Shinji Todaka, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1190 days.

(21) Appl. No.: 11/857,318

(22) Filed: Sep. 18, 2007

(65) Prior Publication Data

US 2008/0068640 A1 Mar. 20, 2008

(30) Foreign Application Priority Data

Sep. 19, 2006 (JP) .................................. 2006-252816

(51) Int. Cl.
*G06K 15/00* (2006.01)
*G06F 3/12* (2006.01)

(52) U.S. Cl. ...................... 358/1.14; 358/1.16; 358/1.18; 358/1.15; 358/1.13

(58) Field of Classification Search .................. 358/1.15, 358/1.16, 1.17, 1.18, 1.14, 1.13, 1.11, 1.9, 358/1.6, 1.2, 1.1, 400, 401, 402, 403, 404, 358/405, 407, 434, 435, 436, 437, 438, 439, 358/444, 448, 468; 347/2, 3, 5, 14, 23; 399/1, 399/6, 8, 9, 10, 11, 18, 19, 20, 21; 710/8, 710/15, 55, 52, 62, 64, 72, 74, 260, 261, 710/263, 266; 713/168, 175, 180
See application file for complete search history.

(56) References Cited

U.S. PATENT DOCUMENTS

| 7,246,241 | B2 * | 7/2007 | Satake et al. | 713/176 |
| 2004/0193889 | A1 * | 9/2004 | Satake et al. | 713/176 |
| 2004/0194012 | A1 * | 9/2004 | Shi | 715/500 |
| 2007/0044009 | A1 * | 2/2007 | Tokunaga | 715/500 |
| 2007/0201926 | A1 * | 8/2007 | Kato | 400/62 |
| 2007/0245146 | A1 * | 10/2007 | Satake et al. | 713/176 |

FOREIGN PATENT DOCUMENTS

| JP | 2001-184186 A | 7/2001 |
| JP | 2003-348284 A | 12/2003 |
| JP | 2004-151896 A | 5/2004 |
| JP | 2004-181739 A | 7/2004 |
| JP | 2005-161841AA | 6/2005 |
| JP | 2005-346180 A | 12/2005 |

* cited by examiner

*Primary Examiner* — Dov Popovici
(74) *Attorney, Agent, or Firm* — Canon U.S.A., Inc., IP Division

(57) ABSTRACT

When an error occurs while a job flow including a plurality of steps is executed, an electronic signature is added to image data processed at a step that has already been performed, and the image data to which the electronic signature is added is stored. At that time, an electronic certificate expiring at the same date as the expiration date of the job flow is generated and added to the electronic signature. Before restarting execution of the job flow where the error occurred, the electronic signature added to the image data is verified and a user is notified of the verification result. A determination is then made whether execution of the job flow where the error occurred should be restarted according to an operation performed by the user in response to the notification.

11 Claims, 14 Drawing Sheets

DATA-PROCESSING DEVICE, DATA-PROCESSING METHOD, AND COMPUTER PROGRAM

BACKGROUND OF THE INVENTION

1. Field of the Invention

The present invention relates to a data-processing device, a data-processing method, and a computer program, and is particularly fitted for storing data on a job flow where an error occurs while the job flow is executed.

2. Description of the Related Art

In recent years, the functions of image-forming devices including a printer, a copier, a facsimile, and so forth have become increasingly sophisticated. Further, multifunction peripherals (MFPs) have become commercially practical, as the image-forming devices, where the MFP is achieved by integrating functions of the printer, the copier, the facsimile, and so forth into a single device. Further, the function of the image-forming device has become highly sophisticated so that image data is edited in the image-forming device and/or the image-forming device performs processing in conjunction with an external device. Further, an increasing number of MFPs that can perform a plurality of processing procedures (steps), as a single job flow, are used, so as to simplify business operations performed by a user working in an office.

According to a printer disclosed in Japanese Patent Laid-Open No. 2004-181739, print data transmitted to the printer is deleted when the transmitted print data does not satisfy printing conditions. Further, if a specified printer is not ready to perform printing immediately, an information-processing device disclosed in Japanese Patent Laid-Open No. 2005-346180 temporarily stores print data in a box area which is a storage area of the printer. Further, according to Japanese Patent Laid-Open No. 2005-346180, the printer prints print data specified by a user when the printer is ready to perform the printing.

However, since data to be processed is deleted according to the technology disclosed in Japanese Patent Laid-Open No. 2004-181739, different data satisfying the printing conditions should be input. Therefore, when the technology disclosed in Japanese Patent Laid-Open No. 2004-181739 is used for a technology provided to process data by using a work flow including a plurality of processing steps and when an error occurs so that the data to be processed does not satisfy a condition for performing the processing steps, the data to be processed is deleted. Then, when restarting the processing performed based on the work flow after an error recovery is made, the processing is started from the step of inputting data, since the data to be processed is deleted. As a result, processing performed at steps that had already been executed before a step where it is determined that the data to be processed does not satisfy the processing condition is wasted.

Further, according to the technology disclosed in Japanese Patent Laid-Open No. 2005-346180, the print data is temporarily stored in the storage area of the printer. Therefore, if an error occurs halfway through the processing procedures of the work flow, the data which is to be processed halfway through the processing procedures is temporarily stored in the box area which is the storage area of the printer, as described above.

Particularly, in recent years, an increasing number of image-forming devices that can store a large amount of data are used. If an external device can access data stored in the image-forming device, the stored data can be changed. As a result, for example, when the print data is stored in the box area and the work flow is restarted without noticing the change in the print data, the processing procedures of the work flow are restarted based on the changed print data. Therefore, it becomes difficult to obtain a desired output result.

Subsequently, a method of storing data where an error occurs in an area inaccessible for an external device may be considered. However, according to the above-described method, even though a worker performing a step different from a step where the error occurs wants to correct the data, it is difficult for the external device to access the data. Therefore, a desired and appropriate correction is performed with difficulty.

SUMMARY OF THE INVENTION

Accordingly, the present invention has been achieved so as not to waste processing that has already been performed in a job flow where an error occurs during execution of the job flow and increase the security of data to be stored when storing data to be processed.

According to an aspect of the present invention, a data processing device includes an execution unit configured to execute processing for data to be processed based on details on the processing according to an instruction to perform a job flow including a plurality of steps, where the details on the processing performed for the data to be processed are defined in the job flow, a detection unit configured to detect occurrence of errors while the execution unit is performing the job flow, and a storage unit configured to manage data processed at a step of the first flow job that has already been performed where an error has occurred by associating validity-guarantee information with the data, where the validity-guarantee information is used to guarantee the validity of the data, and the storage unit is configured to store the data in a storage medium.

Further features of the present invention will become apparent from the following description of exemplary embodiments with reference to the attached drawings.

DESCRIPTION OF THE EMBODIMENTS

Figure 1:
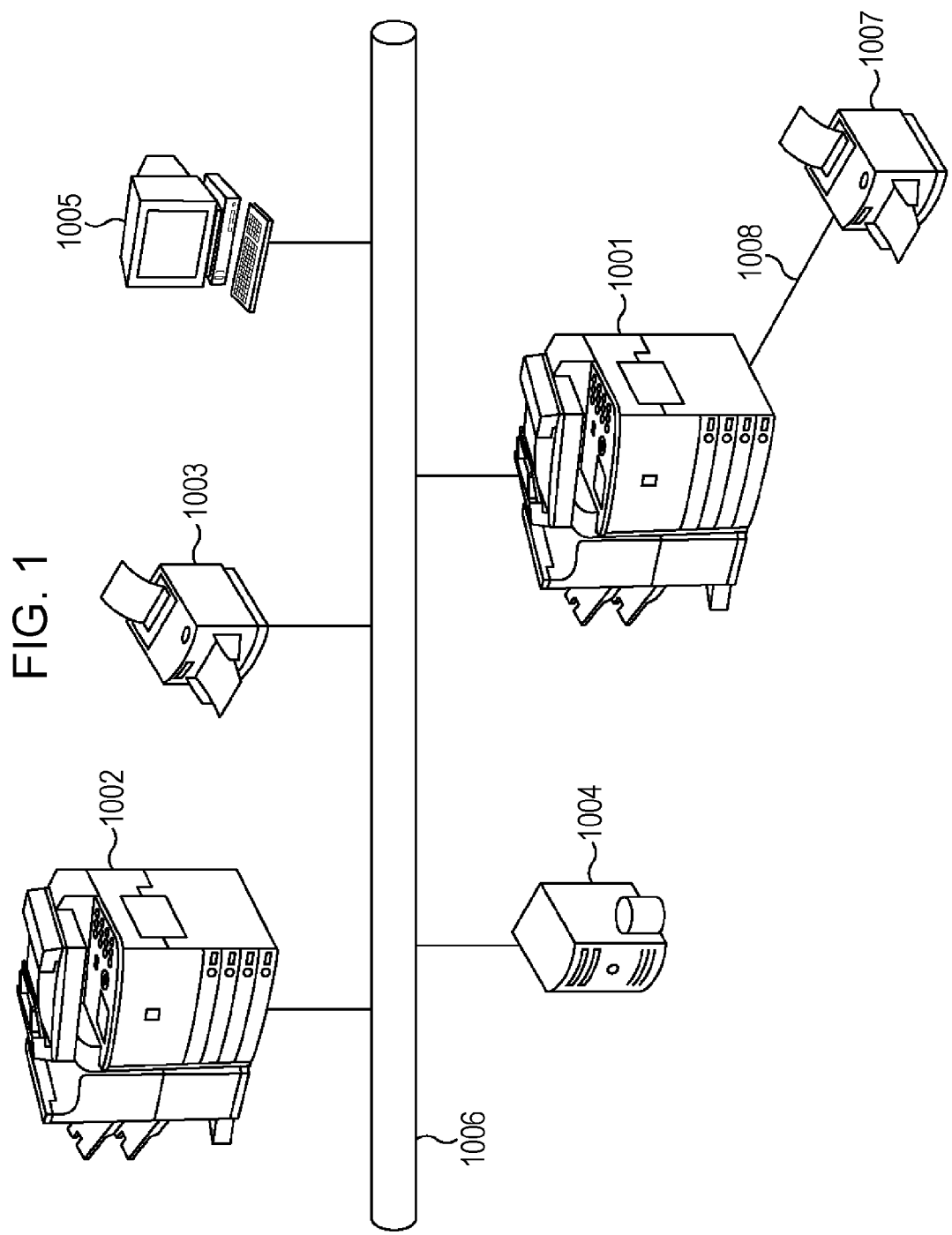
FIG. 1 illustrates an example of the configuration of a network system according to an embodiment of the present invention.

Hereinafter, an embodiment of the present invention will be described with reference to the attached drawings. FIG. 1 illustrates an example of the configuration of a network system including an image-forming device functioning as a data-processing device. The image-forming device includes a data-transmission-and-reception function.

In FIG. 1, a composite machine 1001, a composite machine 1002 having the same functions as those of the composite machine 1001, a facsimile 1003, a database/mail server 1004, and a client computer 1005 are connected to a local-area network (LAN) 1006. The composite machine 1001 and a facsimile machine 1007 are connected to each other via a public switched telephone network (PTSN) 1008.

The composite machine 1001 includes a copying function, a facsimile function, a scanner function, a printer function, and a document-management function. The composite machine 1001 further includes a data-transmission function to read data on a document image and transmit the read document image data to each of the composite machine 1002, the facsimile 1003, the database/mail server 1004, and the client computer 1005.

The composite machine 1001 also includes a function of processing data generated by using a page-description language (PDL). Therefore, the composite machine 1001 receives print job data transmitted from a computer (e.g., the client computer 1005), where the print job data includes image data generated by using the PDL, and prints an image on a recording medium based on the image data included in the transmitted print job data.

In addition, the composite machine 1001 stores the read data, the image data that is transmitted from the computer 1005 and that is generated by using the PDL, etc., in a box area that is provided in a hard-disk drive (HDD) 2004 and that is specified by a user. Then, the composite machine 1001 prints the image data stored in the box area. Here, the box area denotes a part of a storage area provided in the HDD 2004 and a storage area used to store image data, etc.

The composite machine 1001 receives image data read by the composite machine 1002, stores the received image data in the HDD 2004, and prints and outputs the image data. The composite machine 1001 also receives image data stored in the database/mail server 1004, stores the received image data in the HDD 2004, and prints and outputs the image data.

The facsimile 1003 receives the image data read by the composite machine 1001 and transmits the received image data. The database/mail server 1004 receives the image data read by the composite machine 1001, and stores the received image data as a database. Further, the database/mail server 1004 transmits the received image data, as, for example, an electronic mail.

The client computer 1005 acquires desired data from the database/mail server 1004 and displays the acquired data through a display device. Further, the client computer 1005 receives the image data read by the composite machine 1001, and processes and/or edits the received image data. Here, the client computer 1005 may be, for example, a personal computer. The facsimile 1007 receives the image data read by the composite machine 1001 via the PSTN 1008, and prints and outputs the received image data.

Figure 2:
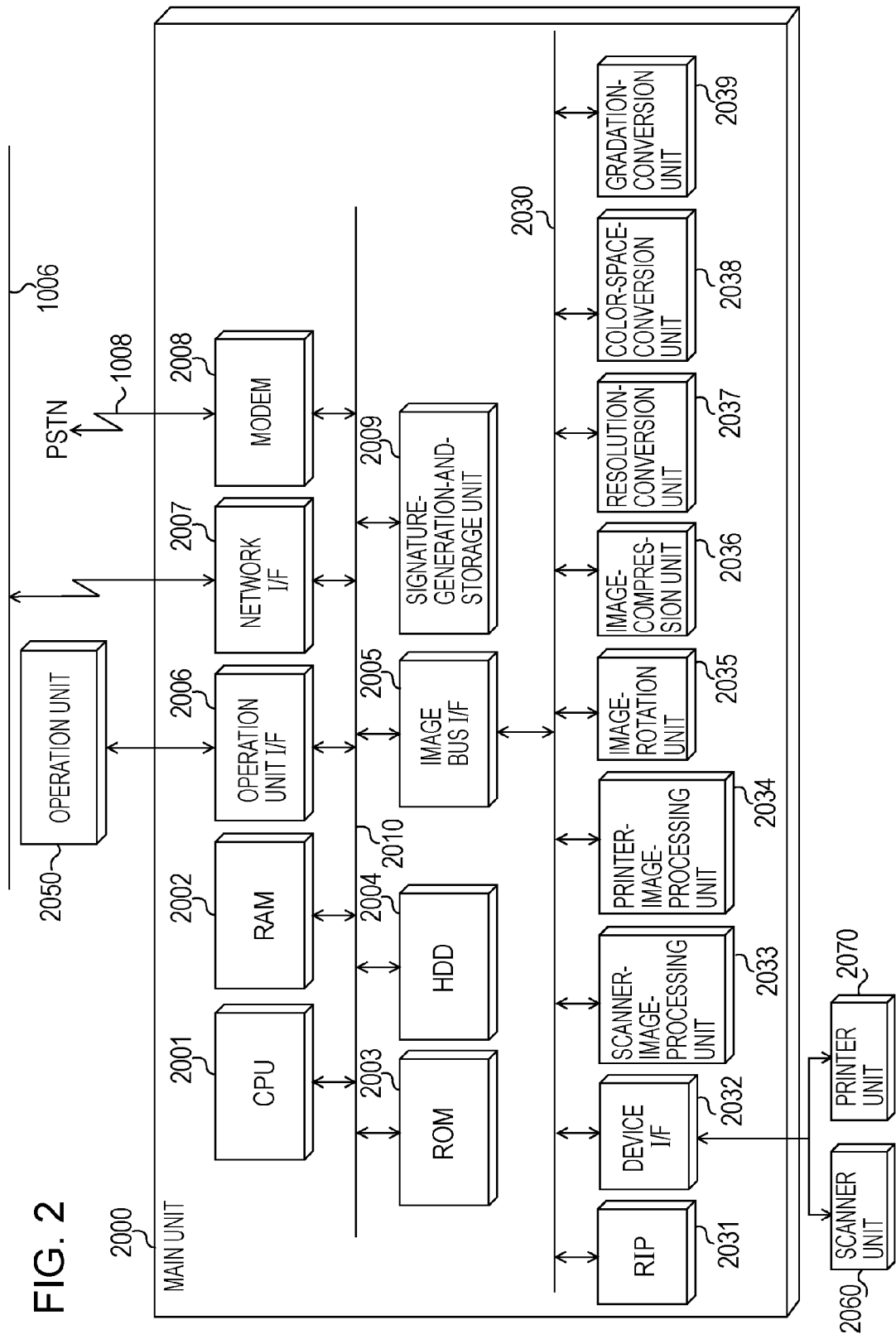
FIG. 2 is a block diagram illustrating an example of the hardware configuration of a composite machine according to an embodiment of the present invention.

FIG. 2 is a block diagram illustrating an example of the hardware configuration of the composite machine 1001. A main unit 2000 is a controller provided to input and/or output document data (image data), image information, device information, etc. The main unit 2000, a scanner unit 2060 which is an image-input device, and a printer unit 2070 which is an image-output device are connected to one another. The main unit 2000 controls the scanner unit 2060 and the printer unit 2070. Subsequently, a scanning function, a printing function, etc., are achieved.

The main unit 2000 is connected to external devices, such as the composite machine 1002, the client computer 1005, etc., via the LAN 1006. The main unit 2000 transmits and/or receives data to and/or from the external device. The main unit 2000 is also connected to the PSTN 1008 and achieves a facsimile function by using the PSTN 1008. The main unit 2000 is connected to an operation unit 2050, as an interface used to present the above-described functions to a user.

A central-processing unit (CPU) 2001 is a controller provided to control the entire main unit 2000. A random-access memory (RAM) 2002 is a system-work memory used by the CPU 2001 to perform an operation. The RAM 2002 is also used as an image memory to temporarily store image data. A read-only memory (ROM) 2003 is provided as a boot ROM storing a boot program, etc., of the network system.

A hard-disk device (HDD) 2004 stores system software, image data, attribute data on the image data, user data, etc. Here, if an error occurs during the execution of a job flow, processing performed by the main unit 2000 is achieved by the system software stored in the HDD 2004. The processing performed by the main unit 2000 when the error occurs during the execution of the job flow is described below. Here, the term "job flow" denotes information that includes a plurality of steps, where details on processing performed for data to be processed are defined in the information. Further, data to which an electronic signature is added during the processing is stored in the HDD 2004.

An operation-unit I/F 2006 is an interface unit provided between the main unit 2000 and the operation unit 2050. The operation-unit I/F 2006 outputs image data for display to the operation unit 2050. Further, the operation-unit I/F 2006 notifies the CPU 2001 of information input by the user by operating the operation unit 2050. Further, a two-dimensional code used to perform the information notification illustrated in FIG. 7 and/or FIG. 11, as described below, is displayed on a display unit of the operation unit 2050.

A network I/F 2007 is connected to the LAN 1006, and inputs and outputs information between the main unit 2000 and external devices such as the composite machine 1002, the client computer 1005, etc. The main unit 2000, according to the present embodiment, supports the Transmission Control Protocol/Internet Protocol (TCP/IP) as a network-communication protocol, and communicates with the external device according to the TCP/IP-communication protocol. While reference is made to the TCP/IP communication protocol, any communication protocol that would enable practice of the present invention is applicable.

A modem 2008 is connected to the PSTN 1008. The modem 2008 inputs and/or outputs image information between the main unit 2000 external devices such as the facsimile 1007, via the PSTN 1008 according to the facsimile function of the composite machine 1001. A signature generation-and-storage unit 2009 generates and stores an electronic certificate used for an electronic signature and a secret key corresponding to the electronic certificate by using device-specific information including data on the current time, the network address, etc. The above-described devices are connected to a system bus 2010.

An image-bus I/F 2005 is used to connect the system bus 2010 and an image bus 2030 and is configured to transfer image data between the two via high speed. According to the present embodiment, the image bus 2030 includes a peripheral-component-protocol (PCI) bus and/or supports the Institute of Electrical and Electronics Engineers (IEEE) 1394 standard. The following devices are connected to the image bus 2030.

A raster-image processor (RIP) 2031 develops a PDL code to a bit-map image, the PDL code being included in the print job data transmitted from an external device such as the client computer 1005. A device I/F 2032 connects the scanner unit 2060, which is the image-input device, and/or the printer unit 2070, which is the image-output device, and the main unit 2000 with each other. The device I/F 2032 also performs synchronous-to-asynchronous conversion for image data.

A scanner-image-processing unit 2033 corrects, processes, edits, etc., the image data transmitted from the scanner unit 2060. Further, the scanner-image-processing unit 2033 determines whether the image data transmitted from the scanner unit 2060 corresponds to a color document or a black-and-white document according to a saturation signal of the image, and stores information about a result of the determination.

A printer-image-processing unit 2034 corrects, processes, edits, etc., the image data output to the printer unit 2070. An image-rotation unit 2035 performs image-rotation processing for the image data transmitted from the scanner unit 2060 in conjunction with the scanner-image-processing unit 2033 and stores the image data subjected to the image-rotation processing in a memory. Further, the image-rotation unit 2035 performs the image-rotation processing for the image data stored in the memory in conjunction with the scanner-image-processing unit 2033 and stores the image data subjected to the image-rotation processing in the memory again. Further, the image-rotation unit 2035 performs the image-rotation processing for the image data stored in the memory in conjunction with the printer-image-processing unit 2034 and outputs the image data subjected to the image-rotation processing to the printer unit 2070 via the device I/F 2032.

A resolution-conversion unit 2037 performs resolution-conversion processing for the image data stored in the memory and stores the image data subjected to the resolution-conversion processing in the memory again. A color-space-conversion unit 2038 performs a matrix calculation, etc., to convert YCbCr (YUV)-image data stored in the memory to L*a*b-image data, and stores the L*a*b-image data in the memory. A gradation-conversion unit 2039 converts image data that is stored in the memory and that is data on an 8-bit image with a 256-step gradation into data on a 1-bit image with a 2-step gradation by performing error-diffusion processing or the like, for example. Then, the gradation-conversion unit 2039 stores the converted image data in the memory.

An image-compression unit 2036 performs compression-and-expansion processing for multivalued image data under the Joint Photographic Coding Experts Group (JPEG) scheme and performs the compression-and-expansion processing for binary image data under the Joint Bi-level Image Experts Group (JBIG) scheme, the Modified MR (MMR) scheme, the Modified Relative edge address designate (MR) scheme, or the Modified Huffman (MH) scheme. The image-rotation unit 2035, the resolution-conversion unit 2037, the color-space-conversion unit 2038, the gradation-conversion unit 2039, and the image-compression unit 2036 can operate in conjunction with one another. For example, when image data stored in the memory is subjected to the image-rotation processing and the resolution-conversion processing, the image-rotation unit 2035 and the resolution-conversion unit 2037 can perform the image-rotation processing and the resolution-conversion processing without using the memory.

Figure 3:
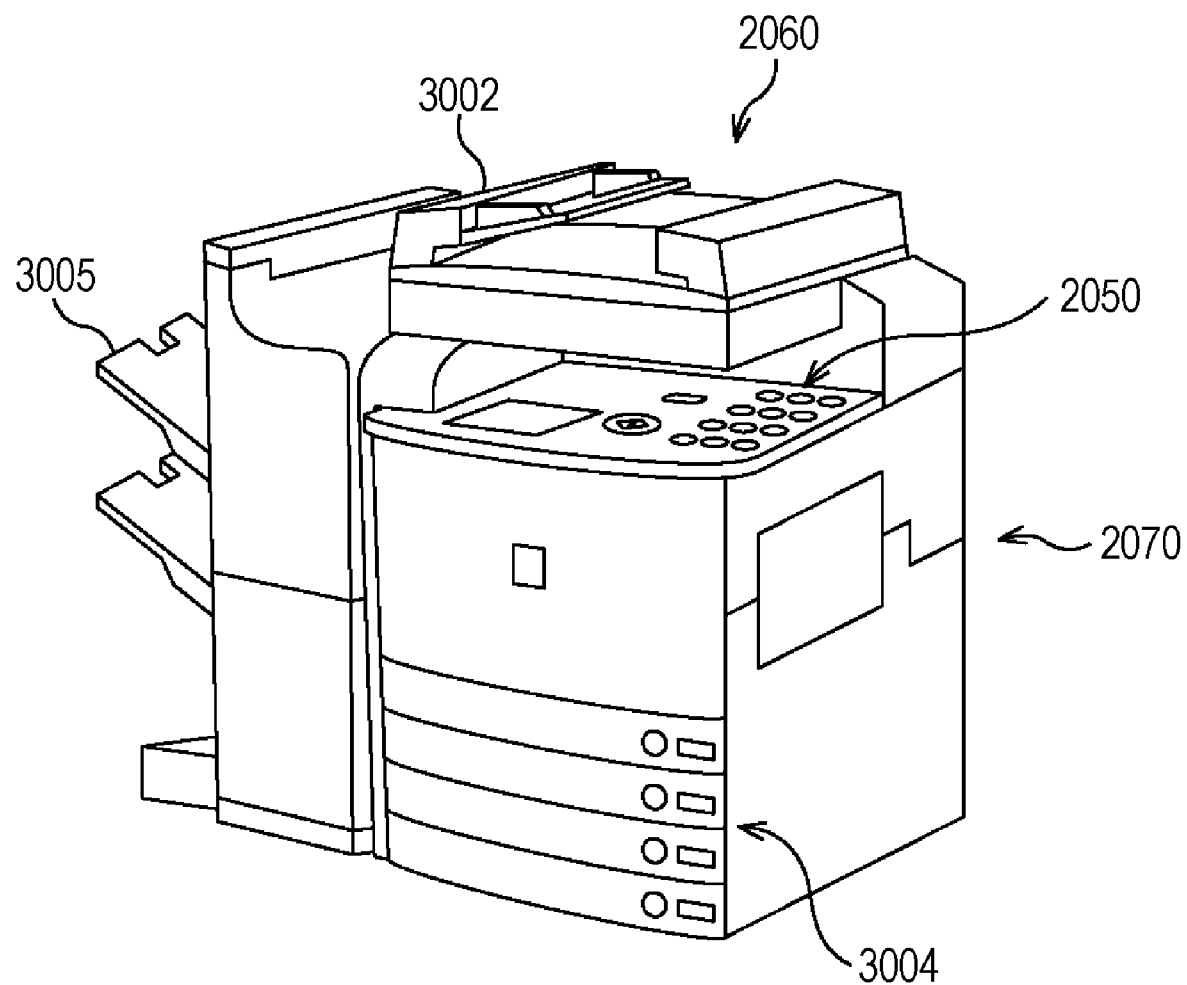
FIG. 3 illustrates an example of the external configuration of a composite machine according to an embodiment of the present invention.

FIG. 3 illustrates an example of the external configuration of the composite machine 1001. As described above, the image-forming device is presented to the user as the composite machine 1001 including a copying function, facsimile function, scanner function, printer function, and document-management function.

The scanner unit 2060 irradiates an original document with light and scans the original document with a charge-coupled-device (CCD)-line sensor, whereby date, e.g., text, images, etc., located on the original document becomes raster-image data, and the raster-image data is converted into electrical signals. The original document can either be placed on a tray of a document feeder 3002, or on a platen (not shown). The user issues an instruction to start reading data via the operation unit 2050, whereby the CPU 2001 transmits data on an instruction to the scanner unit 2060. Subsequently, in the case where the original document is placed on the tray, the document feeder 3002 feeds the original document onto the platen. Then, as described above, the scanner unit 2060 reads data located on the original document.

The printer unit 2070 begins printing data according to the instruction issued by the CPU 2001. Printing occurs by the printer unit 2070 forming an image on a recording medium based on the raster-image data. The printer unit 2070 can print an image on a recording medium under an electrophotography system achieved by using a photosensitive drum and/or a photosensitive belt, etc., an ink-jet system achieved by using a minute-nozzle array which discharges ink so that an image is directly printed on a recording medium, etc. The present embodiment can be achieved by using the electrophotography system, the ink-jet system, or any other system that would enable printing of data on a recording medium.

The printer unit 2070 includes a plurality of paper-feeding stages 3004 include cassettes containing paper so that a user can select a desired paper size from among different paper sizes and/or a desired paper orientation from among different paper orientations. A paper-output tray 3005 is configured to receive the recording medium onto which an image is printed. Here, the composite machine 1001 according to the present embodiment can perform functions of sorting, stapling, etc., according to an instruction issued by the CPU 2001.

Figure 4:
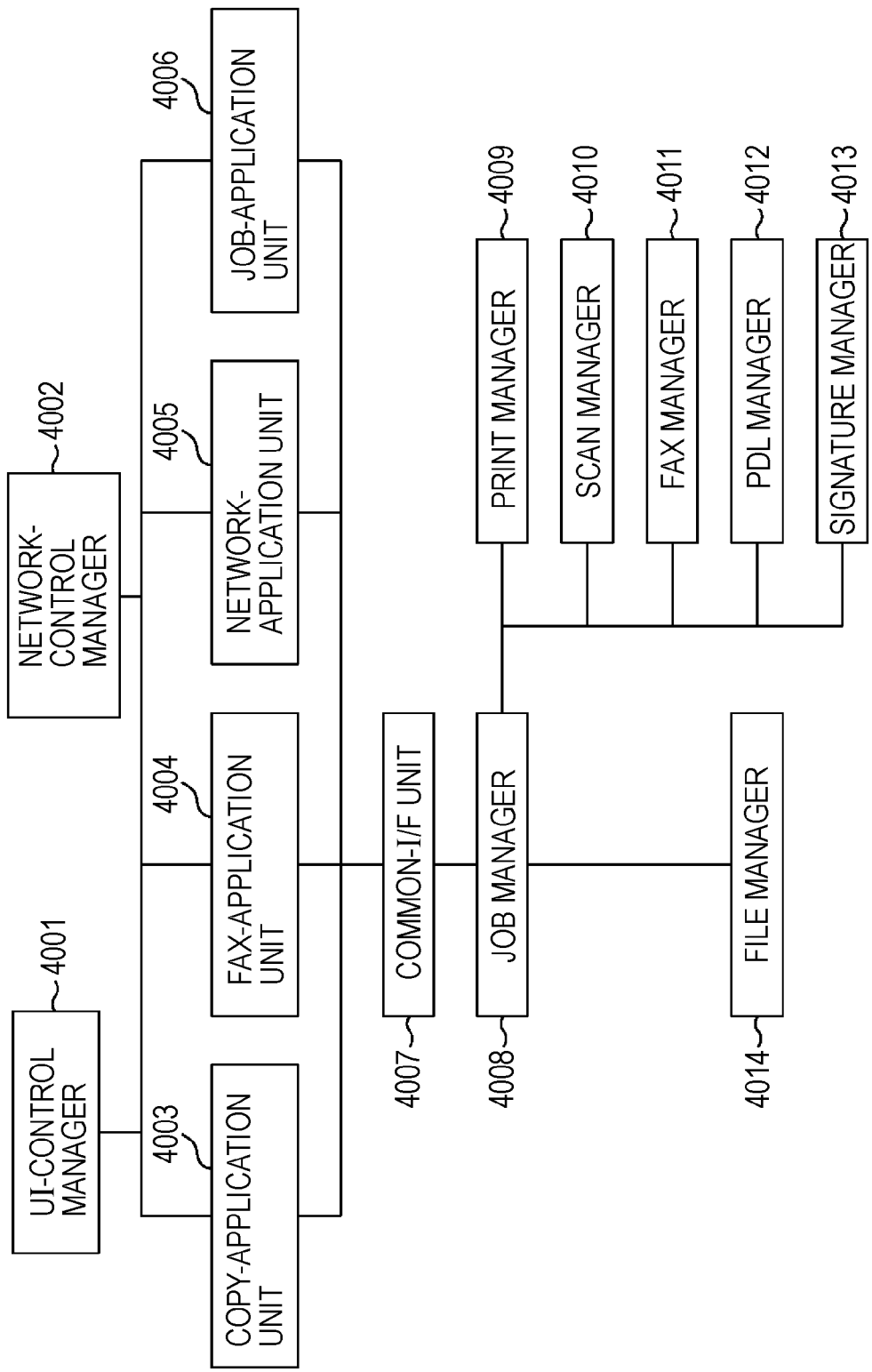
FIG. 4 illustrates an example of the configuration (functional configuration) of system software provided in the composite machine.

FIG. 4 illustrates an example of the configuration of system software provided in the composite machine 1001. The system software including the functions illustrated in FIG. 4 is typically stored in the HDD 2004. A user interface (UI)-control manager 4001 controls the operation unit (display unit) 2050. The UI-control manager 4001 performs control to transmit data on an instruction issued by a user to an underlayer module, display information transmitted from the underlayer module on the operation unit (display unit) 2050, etc.

A network-control manager 4002 performs control to receive an instruction and/or information transmitted from a network, i.e., the LAN 1006, transmit an instruction and/or information transmitted from the main unit 2000 to the network, etc. Each of a copy-application unit 4003, a FAX-application unit 4004, and a network-application unit 4005 receives an instruction transmitted from the UI-control manager 4001 and/or the network-control manager 4002. Then, each of the copy-application unit 4003, the FAX-application unit 4004, and the network-application unit 4005 generates job-file data used to execute the job flow, and transmits the generated job-file data to a job manager 4008 via a common-I/F unit 4007.

A job-application unit 4006 transmits data on an instruction to execute job-file data that has already been stored to the job manager 4008 via the common-I/F unit 4007 according to an instruction issued by the UI-control manager 4001. The common-I/F unit 4007 transmits information transmitted from each of the copy-application unit 4003, the FAX-application unit 4004, the network-application unit 4005, and the job-application unit 4006 to the job manager 4008.

The job manager 4008 organizes the information transmitted from the common-I/F unit 4007 and controls underlayer-control managers attached to devices, that is, a print manager 4009, a scan manager 4010, a FAX manager 4011, a PDL manager 4012, a signature manager 4013, and a file manager 4014 according to the organized information. If information about the processing corresponding to a step included in the job flow in which data is transmitted from the common-I/F unit 4007 indicates the execution of local copying, the job manager 4008 controls the scan manager 4010 and the print manager 4009. More specifically, the job manager 4008 makes each of the scan manager 4010 and the print manager 4009 perform start processing, synchronous processing, termination processing, etc.

If information about the processing corresponding to a step included in the job flow in which data is transmitted from the common-I/F unit 4007 indicates the execution of FAX transmission, the job manager 4008 controls the scan manager 4010, the file manager 4014, and the FAX manager 4011. More specifically, the job manager 4008 makes each of the scan manager 4010, the file manager 4014, and the FAX manager 4011 perform the start processing, the synchronization processing, the termination processing, etc.

If information about the processing corresponding to a step included in the job flow in which data is transmitted from the common-I/F unit 4007 indicates printing of image data generated by using the PDL, the job manager 4008 controls the PDL manager 4012, the file manager 4014, and the print manager 4009. More specifically, the job manager 4008 makes each of the PDL manager 4012, the file manager 4014, and the print manager 4009 perform the start processing, the synchronization processing, the termination processing, etc. More specifically, the PDL may be the laser-beam-printer-image-processing system (LIPS), the PostScript, etc.

Upon receiving information about a job flow including a combination of a plurality of processing procedures (steps), the information being transmitted from the job application 4006 via the common-I/F unit 4007, the job manager 4008 executes the plurality of processing steps included in the job flow. Namely, the job manager 4008 executes processing based on details on the processing for data to be processed according to an instruction to execute the job flow. Further, the job manger 4008 controls processing performed when an error occurs during the job execution. If an error occurs while the job is executed, the job manager 4008 performs management by recognizing to which step the processing steps included in the job flow has finished and from which step the processing should be restarted. Information about the management is written into the status of a job 6001 illustrated in FIG. 6 and a termination step.

The signature manager 4013 performs processing including generation of an electronic certificate, addition of an electronic signature, verification of the electronic signature, etc. The file manager 4014 stores and/or retrieves image data and/or job-file data used for the job flow in and/or from the HDD 2004. Further, the file manager 4014 controls the release of data stored in the HDD 2004 into a network, such as the LAN 1006. Further, the file manager 4014 can perform editing processing for image data, the editing processing including combining a plurality of image-data items, deleting data on a page, etc.

Figure 5:
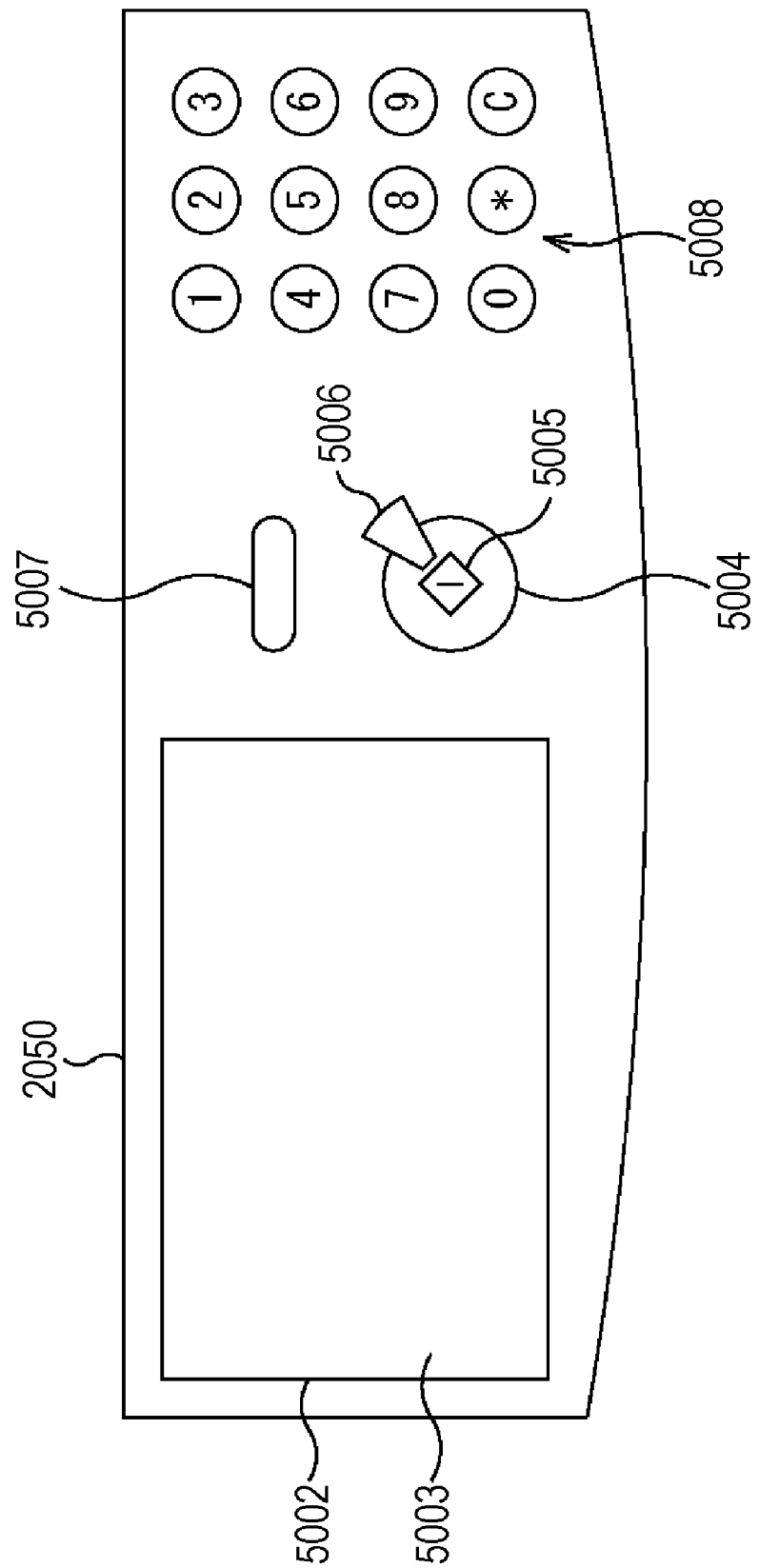
FIG. 5 illustrates an example of the external configuration of an operation unit according to an embodiment of the present invention.

FIG. 5 illustrates an example of the external configuration of the operation unit 2050. In FIG. 5, a touchpanel sheet 5003 is placed on a liquid-crystal display (LCD) provided on an LCD-display unit 5002. The LCD-display unit 5002 displays a screen image used to operate the system and soft keys. When the displayed soft key is selected, the LCD-display unit 5002 informs the CPU 2001 of the position information of the soft key.

A start key 5004 is operated by a user to start a read operation to read data located on an original document. A green and red two-color light emitting diode (LED) 5005 is provided in the center of the start key 5004. The color of the two-color LED 5005 indicates whether the start key 5004 can be used. Typically, green indicates that the start key 5004 can be used and red indicates that the start key 5004 can not be used. The user operates a stop key 5006 to stop an operation currently being performed. The user operates a reset key 5007 to initialize settings, where data on the settings is transmitted from the operation unit 2005. The user operates ten-keys 5008 to input information about a FAX number, the number of copies, etc.

Figure 6:
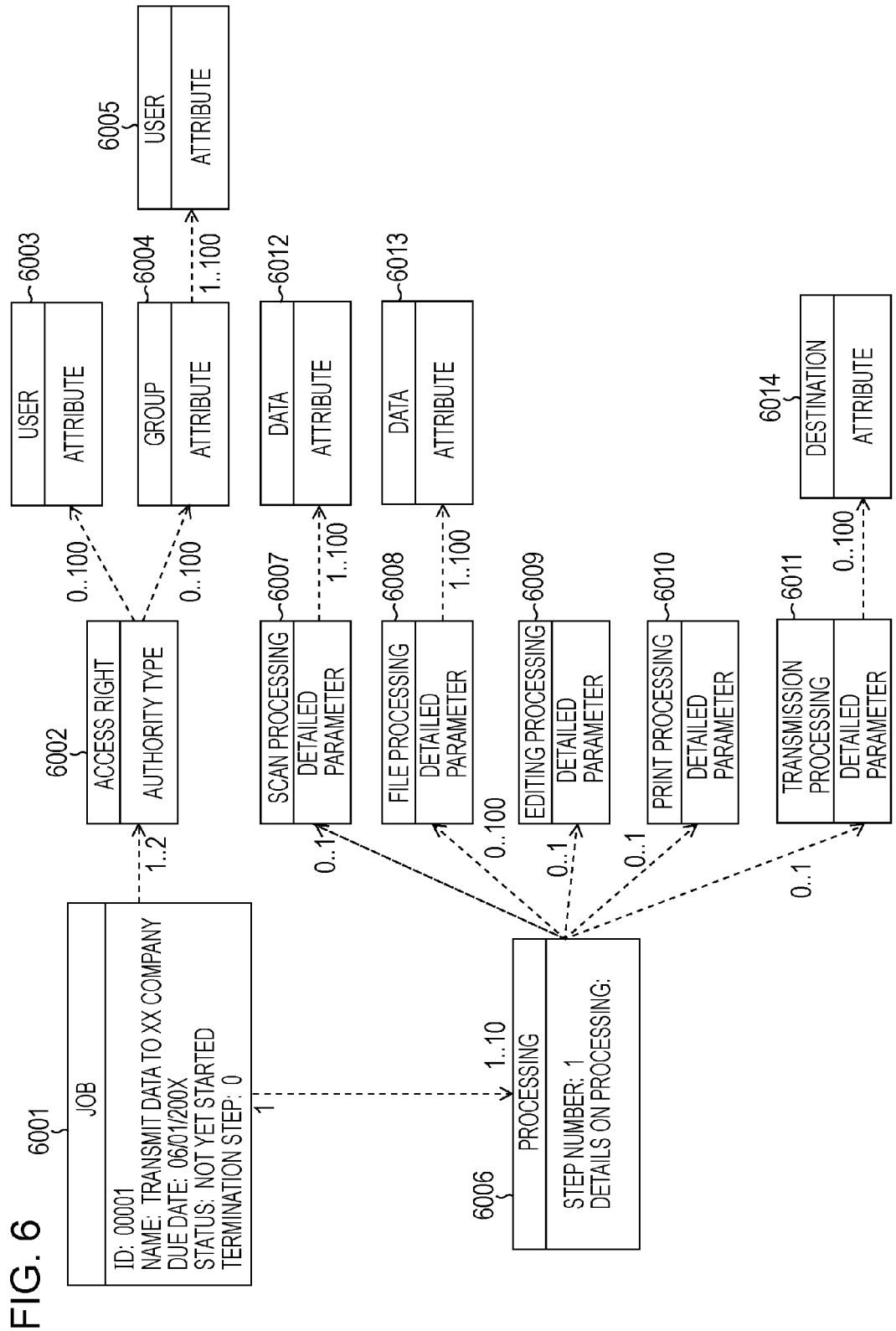
FIG. 6 illustrates an example of the object configuration of a job flow, where data on the job flow is stored in an HDD, according to an embodiment of the present invention.

FIG. 6 illustrates a conceptual example of the object configuration of job-flow data stored in the HDD 2004. The composite machine 1001 of the present embodiment executes processing according to job-file data that encompasses the object configuration illustrated in FIG. 6 and that is stored under an Extensible Markup Language (XML) system. Further, the job-file data is replicated and stored in the HDD 2004 when the job flow is executed. Still further, information about statuses of the job flow is stored during formatting, whereby the job flow is managed. Details associated with object illustrated in FIG. 6 are determined, for example, by the client computer 1005. However, any device that is capable of determining the details associated with an object is applicable.

In FIG. 6, a job object 6001 includes the following information as parameters: ID information which is identification information; information about the name of the job flow; information about the expiration date of the job flow; information about a status of managing the execution state of the job flow; information about a finish step performed to store data on a finished step; etc. An access-right object 6002 manages the right to access the job flow. The access-right object 6002 includes information about right types as parameters. More specifically, the access-right object 6002 stores information about the types of "execution right" and "editing right", as the right types. Information about a user and/or a group having a right set by the access-right object 6002 is given to a user object 6003, a user object 6005, and a group object 6004.

A processing object 6006 is an object managing processing actually performed. The processing object 6006 includes information about step numbers indicating the order in which steps are performed and information about details on processing, the processing-detail information indicating the details and types of processing procedures as parameters. Any one of objects 6007, 6008, 6009, 6010, and 6011 that are configured to manage detailed parameters is linked to the processing object 6006 according to the processing-detail information. For example, if details on processing of the job object 6001 are shown, as "storage→editing→printing", the processing object 6006 is linked to file processing 6008, editing processing 6009, and print processing 6010. Then, information about details on processing and the order in which processing procedures are performed is stored as information about details on the processing corresponding to the processing object 6006. Thus, the objects corresponding to a plurality of processing steps are set to the job flow.

A scan-processing object 6007 includes information about detailed settings on scan processing as parameters. Further, when scanning of an image formed on an original document is performed, a data object 6012 provided to manage data on the scanned image is linked to the scan-processing object 6007. The file-processing object 6008 is linked to the processing object 6006 when file data stored in the HDD 2004 is used as data. The file-processing object 6008 is linked to a data object 6013.

The editing-processing object 6009 is a management object provided to perform editing processing for file data obtained through scan processing and/or file processing. The editing processing includes merge processing, page-delete processing, etc. The print-processing object 6010 manages detailed parameters required to perform printing including 2-in-1 printing, double-sided printing, etc. The transmission-processing object 6011 manages detailed parameters relating to data transmission, including FAX-transmission processing, simple mail transfer protocol (SMTP)-transmission processing, server message block (SMB)-transmission processing, file transfer protocol (FTP)-transmission processing, etc. Further, destination information used to perform the transmission processing is managed as a destination-information object 6014.

Figure 7:
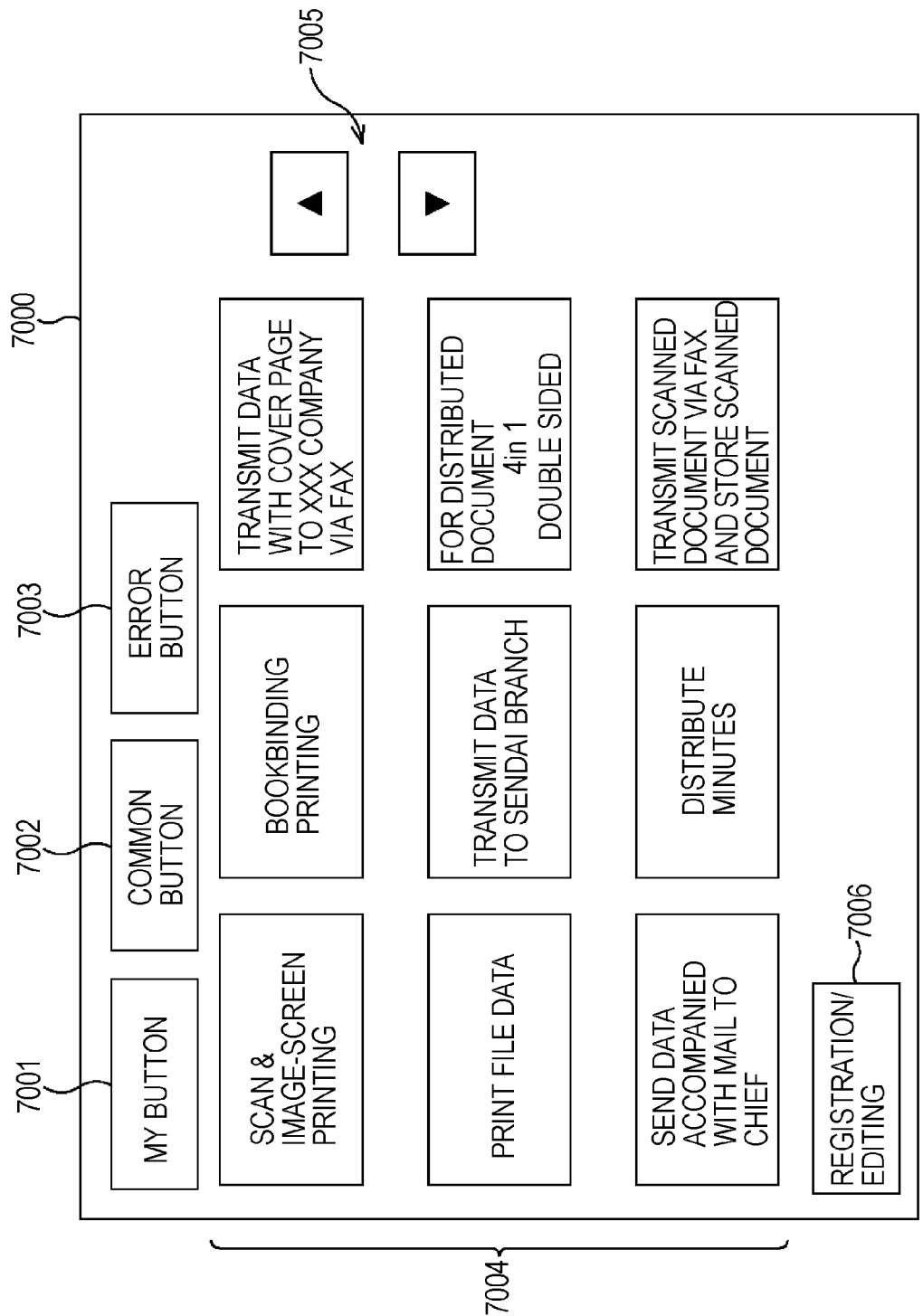
FIG. 7 illustrates an example of the configuration of a display-screen image displaying the list of job flows according to an embodiment of the present invention.

FIG. 7 illustrates an example of the configuration of a display-screen image 7000 displaying the list of job flows. The display-screen image 7000 is displayed on the LCD-display unit 5002 of the operation unit 2050. As illustrated in FIG. 7, the list of job flows is displayed in a display area 7004 as soft buttons. The names of job flows are displayed on the soft buttons. A user can perform a desired job flow by selecting the soft button displaying the name of the desired job flow. Further, each of the job flows includes information about processing steps that are performed for the job flow.

When the user selects a "My Button" 7001, the display area 7004 displays the list of job flows to which only the user who has logged into the system has access. When the user selects a common button 7002, the display area 7004 displays the list of job flows to which other users have access. When the user selects an error button 7003, the display area 7004 displays the list of job flows where errors arise. When the user selects the displayed soft button, execution of the job flow where error arises is restarted.

Scroll buttons 7005 are operated by the user to make the display area 7004 display a job flow that is not initially displayed in the display area 7004. A registration/editing button 7006 is operated by the user to register data on another job flow and/or edit data on a job flow that has already been registered.

Figure 8:
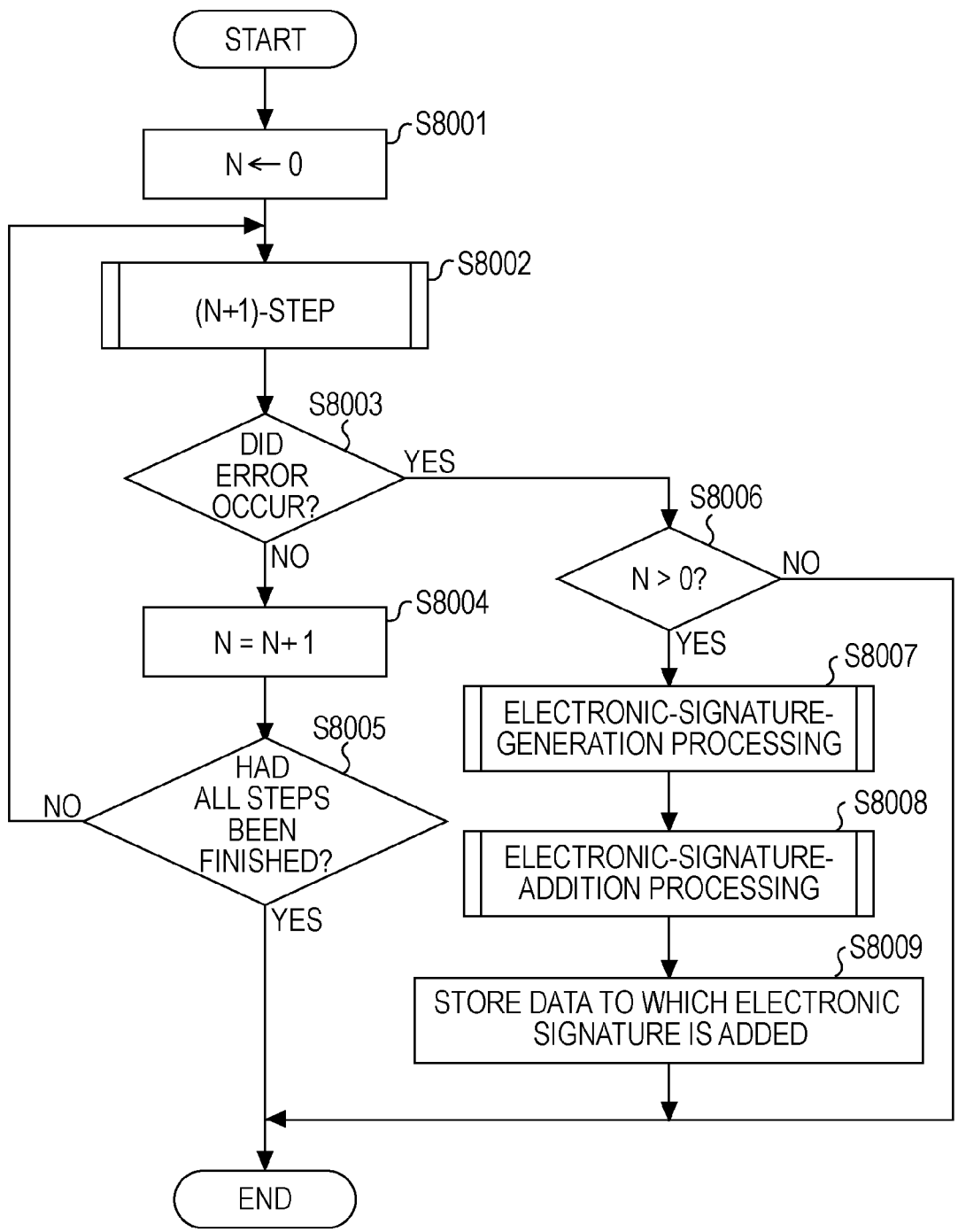
FIG. 8 is a flowchart illustrating example processing procedures performed by the composite machine to execute the job flow according to an embodiment of the present invention.

Next, a flowchart of FIG. 8 illustrates example processing procedures performed by the composite machine 1001 to execute the job flow. When the user selects a desired soft button from among the soft buttons displayed in the display area 7004, the job manager 4008 starts executing the processing procedures illustrated in FIG. 8. Further, the processing procedures illustrated in FIG. 8 are performed based on the job-file data having the configuration illustrated in FIG. 6.

First, at step S8001, the job manager 4008 sets the value N of an internal counter to zero. The internal counter is used to count to which step the processing of the job flow progresses and is retained, for example, in the RAM 2002. Next, at step S8002, the job manager 4008 makes a request to execute the job flow corresponding to the (N+1) step based on the job-file data. More specifically, the job manager 4008 requests any of the processing managers illustrated in FIG. 4 to execute a step, where the step is one of steps of the job flow, according to details on the steps of the job flow to be executed.

Next, at step S8003, the job manager 4008 determines whether an error occurs during execution of steps of the job flow, where the execution of the job flow was requested at step S8002. More specifically, the processing manager that received the above-described request transmits information about the status of processing performed by a processing-execution unit to the job manager 4008. If an error occurs during the execution of steps of the job flow, each of the processing managers 4009 to 4012 who received the request transmits processing-status information including error information to the job manager 4008. The job manger 4008 determines whether an error occurs based on the processing-status information.

More specifically, details on the processing of the job flow are determined to be, for example, "scanning step→storage step→editing step→printing step". At the scanning step, image data is generated based on a document subjected to scanning. The storage step is provisionally determined to be a step where the image data generated through the scanning is stored in a specified first storage area. The editing step is determined to be a step where image data stored in a second storage area and the scanned-image data stored in the first storage area are combined with each other.

Here, for example, if the above-described combining step ends in failure due to the difference between the resolution of the scanned-image data stored in the first storage area and that of the image data stored in the second storage area, it becomes difficult for the file manger 4014 to perform the combining processing, i.e., an error occurs. In that case, the above-described two image-data items subjected to the combination processing are retained in the first and second storage areas as they are. If every user can access both storage areas, details on image data stored in both storage areas may be changed by a user other than the user who requested performance of the job flow.

When the two image-data items subjected to the combining processing are deleted, the scanning step and the storage step that have already been executed are performed again to finish the above-described processing procedures indicated as "scanning step→storage step→editing step→printing step". As a result, the scan step and the storage step that had been executed before the error occurrence may be wasted.

When the job manager 4008 determines in step S8003 that no error occurred during the execution of steps of the job flow the processing advances to step S8004. Then, the job manager 4008 adds one to the value N of the internal counter. Next, at step S8005, the job manager 4008 determines whether all of the steps of the job flow have been executed. If it is determined that all of the steps of the job flow are completed, the processing ends. On the other hand, if all of the steps of the job flow have not been completed, the processing returns to step S8002.

When the job manager 4008 determines in step S8003 that an error occurred during the execution of steps of the job flow the processing advances to step S8006. Then, the job manager 4008 determines whether the value N of the internal counter is larger than zero. The determination made at step S8006 is used to determine whether image data (document data) exists, where an electronic signature is added to the image data as validity-guarantee information.

Figure 9:
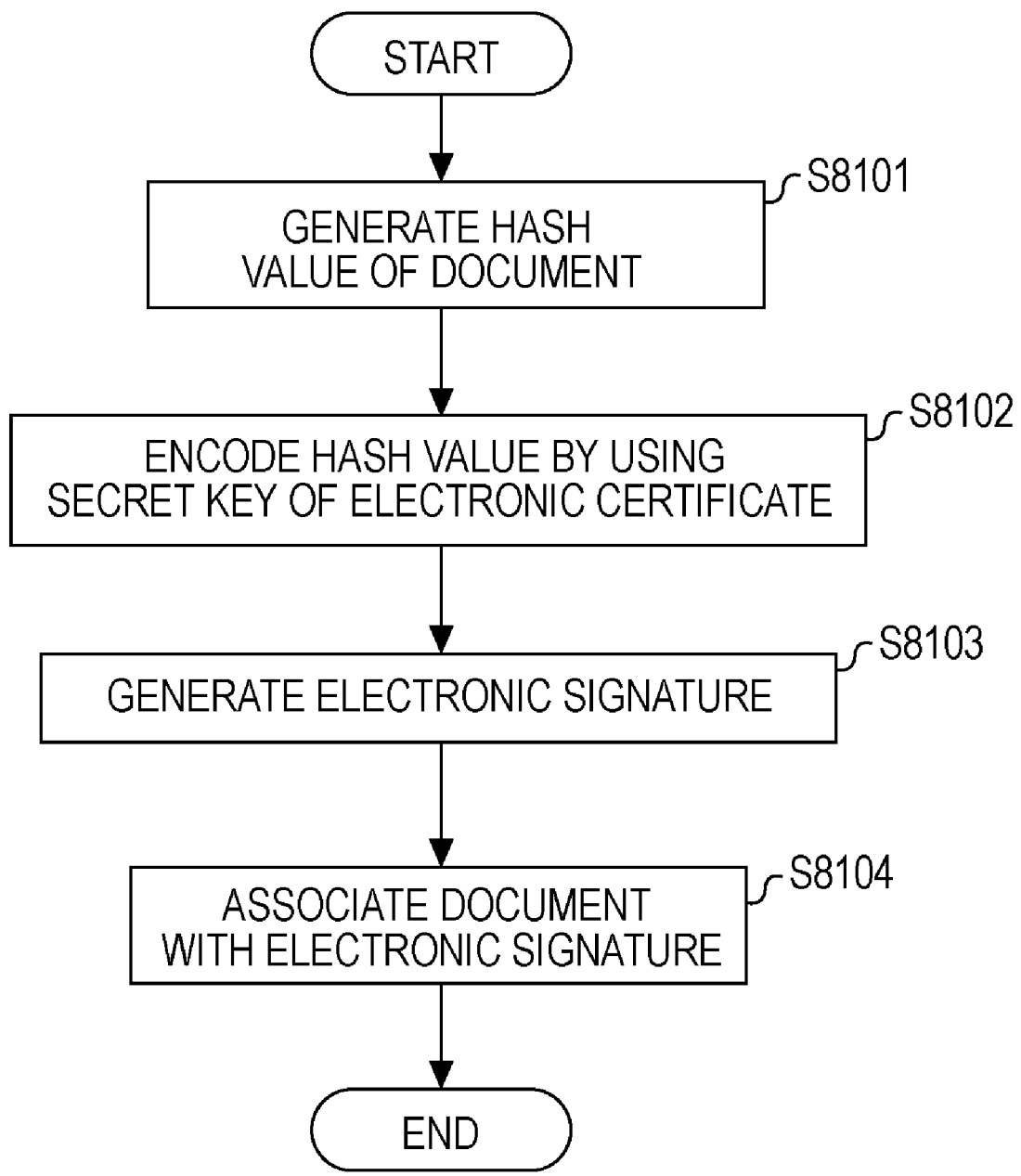
FIG. 9 is a flowchart illustrating example signature-addition processing in detail according to an embodiment of the present invention.
Figure 14:
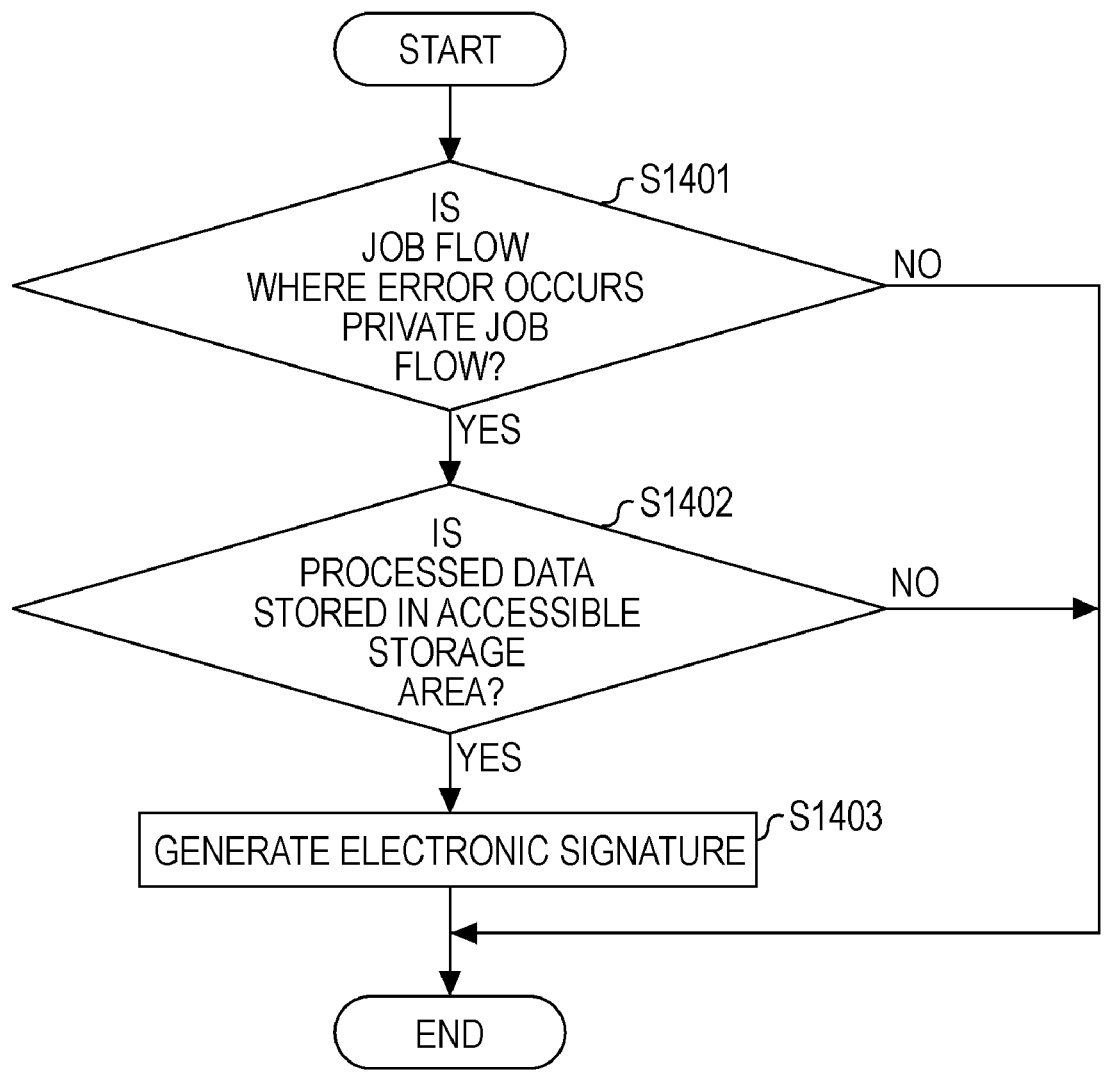
FIG. 14 is a flowchart illustrating example electronic-signature-generation processing according to an embodiment of the present invention.

The term "validity-guarantee information" denotes an electronic signature generated by the signature manager 4013 by performing processing illustrated in FIG. 14 and steps S8101, S8102, and S8103 of FIG. 9. Namely, if an error occurs during execution of a job flow that can be performed by a first user, the signature manager 4013 manages data processed at a step that had already been performed by associating validity-guarantee information with the data, the validity-guarantee information being used to guarantee the validity of the data. On the other hand, if an error occurs in a job flow that can be executed by a second user, the signature manager 4013 does not manage data processed at a step that had already been executed by associating the data with validity-guarantee information used to guarantee the validity of the data. Thus, the signature manager 4013 may perform or may not perform the electronic-signature-generation processing based on the attribute of the job flow.

In other words, at step S8006, it is determined whether at least an initial step (the first step) is finished properly. If a result of the determination made at step S8006 indicates that the value N of the internal counter is not greater than zero (if the first step is not performed), the job manager 4008 determines that no document data to which the electronic signature is added exists and terminates the processing without performing signature processing.

On the other hand, if the value N of the internal counter is greater than zero, the processing advances to step S8007. Then, the job manager 4008 requests the signature manger 4013 to perform electronic-signature-generation processing. Accordingly, the electronic-signature-generation processing is performed. The above-described electronic-signature-generation processing is performed to generate an electronic certificate which expires on the same date as the expiration date of a job flow indicated by the job 6001. The processing corresponding to step S8007 is described below with reference to FIG. 14. During the electronic-signature-generation processing, the secret key corresponding to the electronic certificate is also generated. Data on both the generated electronic certificate and secret key is stored in the signature generation-and-storage unit 2009.

Next, at step S8008, the job manager 4008 requests the signature manager 4013 to perform electronic-signature-addition processing, whereby the electronic-signature-addition processing is performed. The secret key used to perform the electronic-signature-addition processing is generated at step S8007. The electronic-signature-addition processing is described below with reference to FIG. 9.

Finally, at step S8009, the job manager 4008 stores the image data to which the electronic signature is added in the box area of the HDD 2004 and terminates the processing. At that time, the status of the job file is updated and job-file data that is not yet updated is rewritten as updated job-file data. In other words, if it is detected that an error occurs in a job flow, the job manager 4008 manages data processed at a step that had already been executed, the step being included in a plurality of steps of the job flow, by associating the data with validity-guarantee information that guarantees the validity of the data.

After that, when the user selects the error button 7003, a soft button relating to the job-file data whose status had been updated is displayed on the display area 7004. Further, external devices, such as those connected to LAN 1006, can access the box area where image data is stored.

An example of the electronic-signature-generation processing performed at step S8007 is described with reference to the flowchart of FIG. 14. The processing illustrated in FIG. 14 is executed by the signature manager 4013 according to a request made by the job manager 4008. At step S1401, the signature manger 4013 determines whether a job flow, where an error presently occurs, is a private job flow. The above-described determination is achieved by determining whether a button displayed according to an instruction issued from the "My Button" 7001.

If it is determined in step S1401 that the job flow where the error presently occurs is the private job flow, the signature manger 4013 determines in step S1402 whether data processed at a step performed before the error occurrence is stored in an accessible storage area. If it is determined in step S1402 that data for processing is stored in the accessible storage area, in step S1403 the signature manager 4013 generates an electronic signature used to guarantee the validity of data stored by error. The processing performed at step S1403 is described below with reference to steps S8101, S8102, and S8103 of FIG. 9.

According to FIG. 14, data for processing is protected during the execution of the private job flow. However, the data for processing may be protected during the execution of an opposite job flow. Since a common job flow is commonly used, the common job flow may have an effect larger than that of the private job flow. In that case, the data for protection may be protected during the execution of the common job flow.

Next, an example of the signature-addition processing performed at step S8008 will be described with reference to the flowchart of FIG. 9. Processing procedures illustrated in FIG. 9 are executed by the signature manager 4013 according to a request made by the job manager 4008. First, at step S8101, the signature manager 4013 calculates the hash value of image data to which an electronic signature is added. A hash function used to calculate the hash value may be a Message Digest Algorithm (MD) 5, a Secure Hash Algorithm (SHA)–1, etc.

Next, in step S8102, the signature manager 4013 encodes the hash value calculated at step S8101 by using the secret key corresponding to the electronic certificate generated at step S8007. Next, at step S8103, the signature manager 4013 generates an electronic signature including the encoded hash value and an electronic certificated generated for image data for processing. Here, the electronic signature may be formed as a Public Key Cryptography Standards (PKCS)#7, a Portable Document Format (PDF) signature, etc.

Next, at step S8104, the signature manager 4013 performs processing to associate the electronic signature generated at step S8103 with the image data. For performing the association, the image data and the electronic signature may, for example, be combined into a single file. Further, the signature manager 4013 may determine the electronic signature to be one of attributes of the image data without combining the image data and the electronic signature directly, and store the image data and data on the electronic signature in the HDD 2004. The signature manager 4013 may associate the electronic-signature data with the image data, and store the electronic-signature data and the image data.

Figure 10:
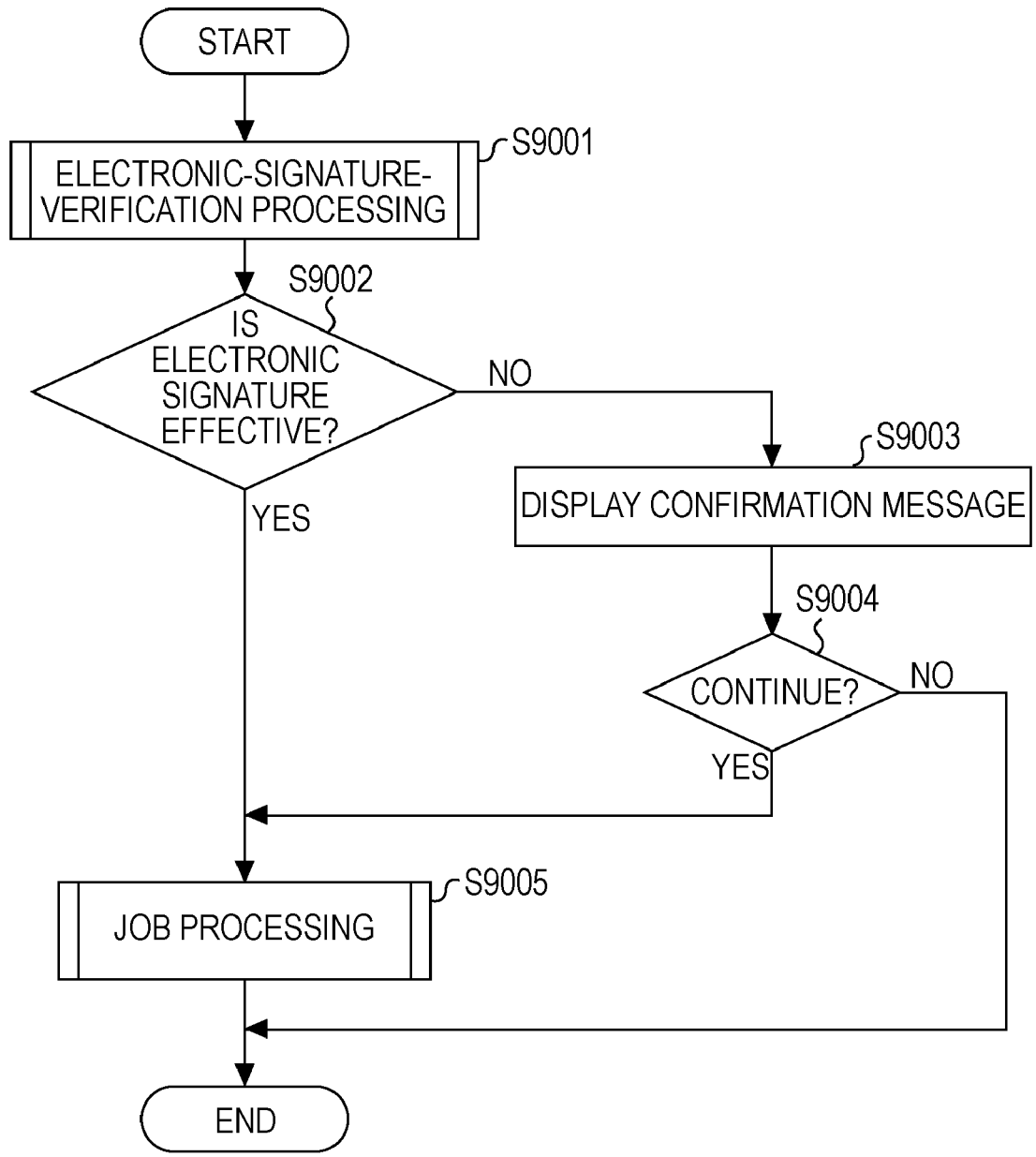
FIG. 10 is a flowchart illustrating example processing procedures performed by the composite machine when execution of a job flow that had been terminated due to an error is restarted according to an embodiment of the present invention.

Next, example processing procedures performed by the composite machine 1001 when execution of a job flow that has been terminated due to an error is restarted is described with reference to the flowchart of FIG. 10. When the user selects the error button 7001, selects a desired soft button from among the soft buttons illustrated in the display area 7004, and selects a soft button, the job manager 4008 begins executing the processing procedures illustrated in FIG. 10. The processing procedures illustrated in FIG. 10 are executed based on the job-file data having the configuration illustrated in FIG. 6.

First, at step S9001, the job manager 4008 requests the signature manager 4018 to verify the electronic signature added to the image data. Subsequently, verification of the electronic signature is performed. The processing performed at step S9001 is described below with reference to FIG. 12. Next, at step S9002, the job manager 4008 determines a result of the electronic-signature verification performed by the signature manager 4018 according to the request made by the job manager 4008 at step S9001. When a job flow where an error is detected is restarted, the job manager 4008 verifies the validity-guarantee information associated with data to be processed in the job flow.

If a result of the above-described determination indicates that the electronic signature is effective, the processing advances to step S9005. Then, the job manager 4008 requests the processing managers 4009 to 4012 that can perform the remaining steps of the job flow to perform the remaining steps. Subsequently, the remaining steps of the job flow are executed to restart the processing from the step where the error occurred. The processing is terminated after the remaining steps of the job flow are executed.

Figure 11:
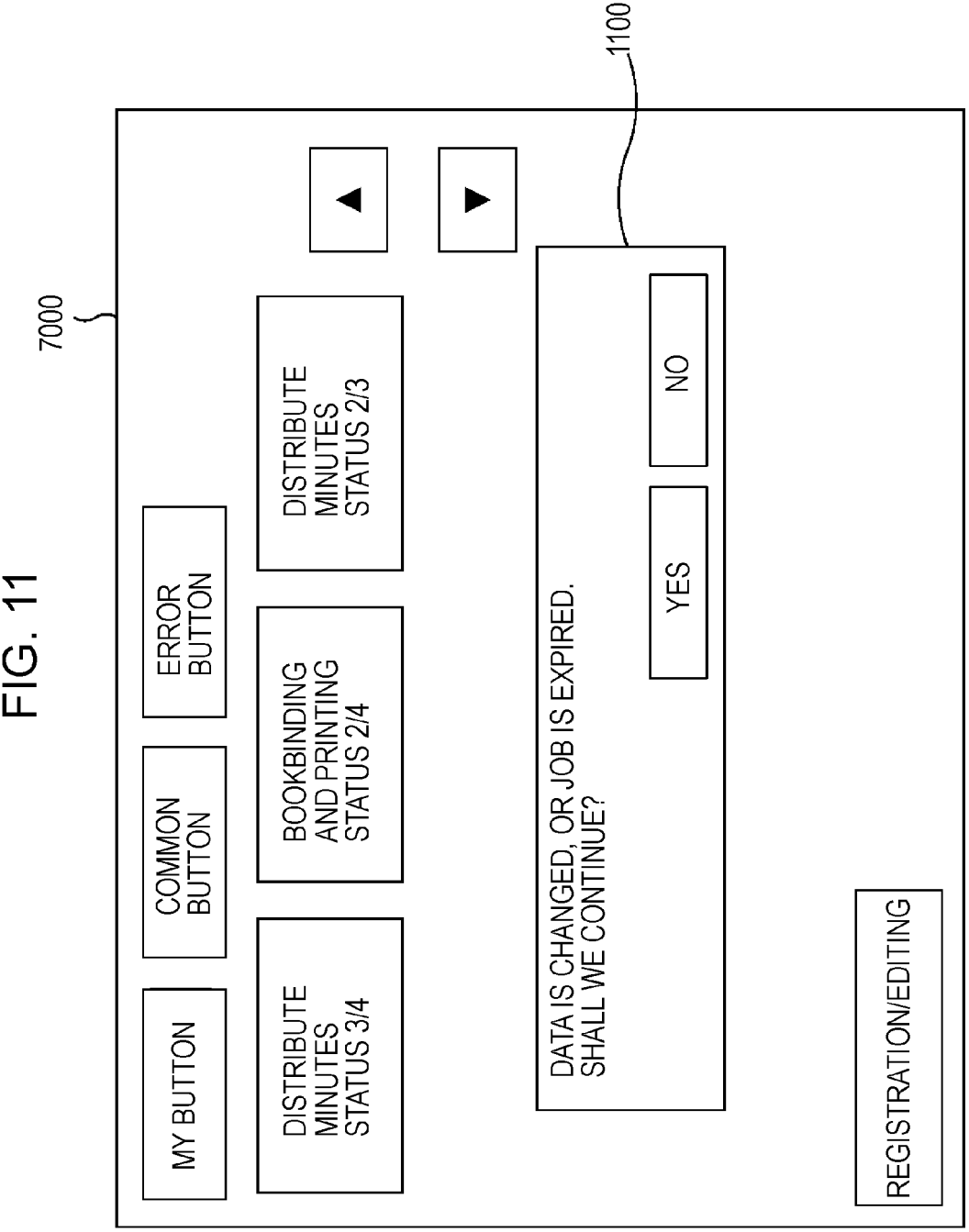
FIG. 11 illustrates an example dialog box depicting a confirmation message displayed on a display-screen image according to an embodiment of the present invention.

If the electronic signature is not effective, the processing advances to step S9003. Then, the job manager 4008 notifies the user that the electronic signature is not effective. The notification is performed by displaying a confirmation message on the LCD-display unit 5002 of the operation unit 2050. FIG. 11 illustrates an example of a dialog box 1100 illustrating the confirmation message, where the dialog box 1100 is displayed on the display-screen image 7000 when the error button is specified. The dialog box 1100 includes buttons used to execute a job flow where an error occurs during the processing.

FIG. 11 illustrates that an error occurs in each of three job flows and the processing corresponding to each of the three jobs is currently in progress. Then, the user is notified that an instruction to execute the job flow is issued to restart the job flow where the error occurs, at least one of the case where image data processed in the job flow is changed, and the case where the job flow is expired is achieved. In other words, the electronic signature (validity-guarantee information) includes information indicating the expiration date of the job flow and information provided to confirm whether data that has already been processed is changed.

Returning to FIG. 10, at step S9004, the job manager 4008 determines whether the remaining steps of the job flow should be performed according to an instruction issued by the user and that is shown in the dialog box 1100 displayed at step S9003. If it is determined that the remaining steps of the job flow should be performed according to a result of the above-described determination, the processing advances to step S9005, so that the remaining steps of the job flow are executed and the processing is terminated. On the other hand, if the remaining steps of the job flow should not be performed, the processing is terminated immediately.

Figure 12:
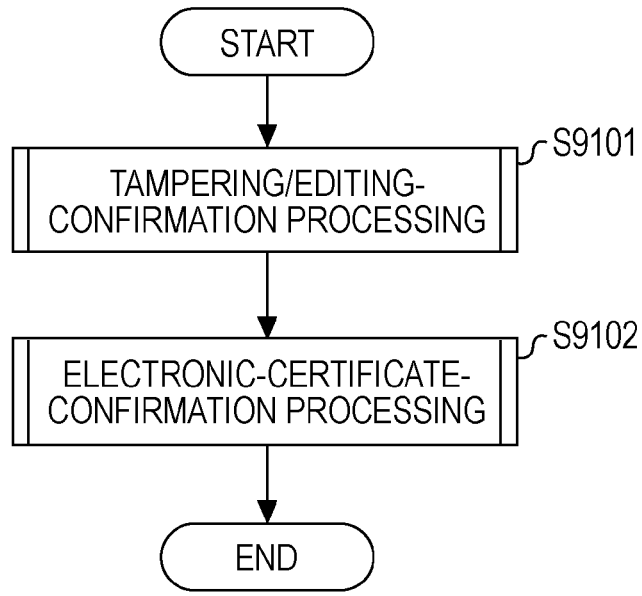
FIG. 12 is a flowchart illustrating example electronic-signature-verification processing according to an embodiment of the present invention.

Next, an example of the electronic-signature-verification processing performed at step S9001 will be described with reference to the flowchart of FIG. 12. Processing procedures illustrated in FIG. 12 are performed by the signature manager 4018 according to a request made by the job manager 4008. First, at step S9101, tampering/editing confirmation processing is performed. First, the signature manager 4018 decodes the hash value included in the electronic signature by using the secret key provided in the electronic certificate included in the electronic-signature data. Further, the signature manager 4018 calculates a hash value based on image data which is to be signed (to be processed when the job flow is restarted). Then, the signature manager 4018 compares the hash value decoded by using the secret key provided in the electronic certificate to the hash value calculated based on the image data which is to be signed (to be processed when the job flow is restarted). If a result of the above-described comparison indicates that the two hash values are different from each other, the signature manager 4018 determines that the image data is changed and the electronic signature is invalid. On the other hand, if the two has values are equivalent to each other, the signature manager 4018 determines that the image data is not changed and the electronic signature is valid.

Next, at step S9102, the electronic certificate used for the electronic signature is confirmed. According to the present embodiment, the above-described confirmation is performed to confirm the expiration date. Namely, the signature manager 4018 determines whether the expiration date written on the electronic certificate included in the electronic signature is overdue. If a result of the above-described determination indicates that the expiration date written on the electronic certificate is overdue, the signature manager 4018 determines that the job flow is expired and the electronic signature is invalid. On the other hand, if the expiration date written on the electronic certificate is not overdue, the signature manager 4018 determines that the job flow is not expired and the electronic signature is valid.

The signature manager 4018 may request the source of issuing the electronic certificate for determination to transmit data on a certificate-revocation list (CRL) indicating invalid electronic certificates to determine whether the electronic signature is valid. An example of the processing procedures illustrated in FIGS. 8, 9, 10, and 12 is described with reference to FIG. 15.

Figure 15:
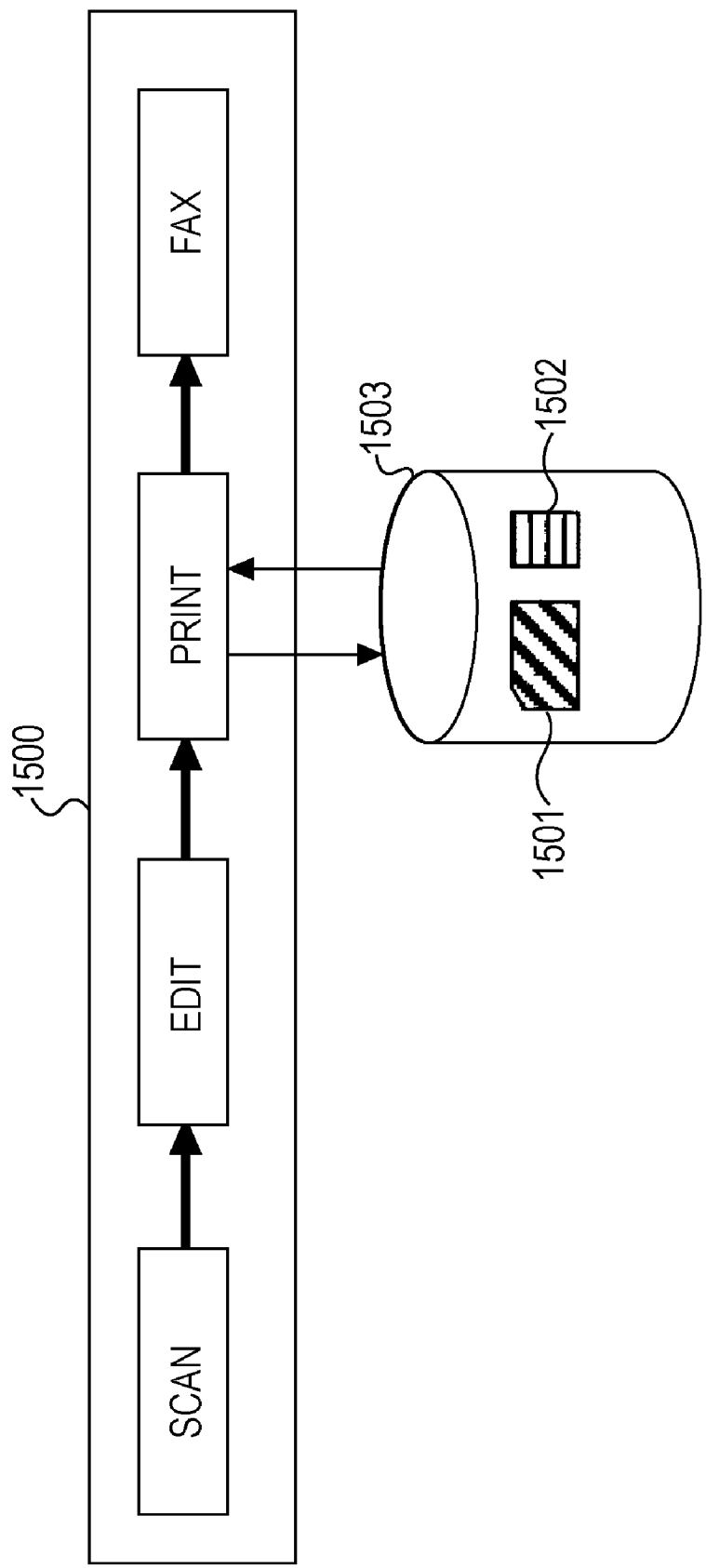
FIG. 15 illustrates an example of a conceptual view of an embodiment of the present invention.

In FIG. 15, an error occurs at the printing step of a job flow 1500 including the steps of "scanning→editing→printing→FAX". In the job flow 1500, editing is performed for scanned image data and an error occurs during printing of data obtained through the editing. If the image data is deleted for retaining the security of the image data, the scanning step and the editing step that have already been performed are wasted. On the other hand, when the data obtained through the editing is stored in an area to which an external device can get access, the data may be changed by an outsider, etc., and an undesired output result may be obtained after the job flow 1500 is restarted.

According to the present embodiment, when storing data 1501 that has been processed before the step where the error occurs, as described in FIG. 8, in a memory 1503, the processed data 1501 is managed by associating an electronic signature 1502 with the processed data 1501, the electronic signature 1502 being used to guarantee the validity of the processed data 1501. As a result, even though the processed data 1501 is changed, at the time where the job flow is restarted, the electronic-signature data 1502 is compared to data which is to be processed at the job-flow-restart time. If a change in the data 1501 is discovered, a warning-screen image is displayed. Therefore, a user who has instructed to restart a work flow can recognize the change in the data 1501.

Thus, according to the present embodiment, if an error occurs during execution of a job flow including a plurality of steps, the job manager 4008 associates image data properly processed at a step that has been executed with an electronic signature, and stores the image data in a box area. At that time, the job manager 4008 generates an electronic certificate expired at the same date as the expiration date of the job flow, and adds the generated electronic certificate to the electronic signature. After that, before restarting execution of the job flow where the error occurs, the job manager 4008 verifies the electronic signature added to the image data. If a result of the verification indicates that the image data is changed and/or the job flow is expired, the job manager 4008 notifies the user of the verification result. The job manager 4008 determines whether execution of the job flow where the error occurs should be restarted according to an operation performed by user in response to the above-described notification.

Thus, the electronic signature is added to the image data processed at the step that has been executed. Subsequently, it becomes possible to determine whether the image data processed at the step that has been executed is effective (valid) at the time where the remaining steps of the job flow are started. Then, if the image data processed at the step that had been executed is not effective (valid), the user is warned. Subsequently, it becomes possible to prevent the remaining steps of the job flow from being performed when the user does not know that the image data processed at the step that has been executed is not effective (valid). Therefore, the job flow can be executed more safely than in the past. Further, since editing (changing) of image data obtained through a job flow where an error occurs is not prohibited, the user's convenience is not affected.

At the time where an error occurs, image data may be saved in a storage area which is difficult for any user to access so that an object of the present invention is achieved. However, if the image data which is going to be processed at the time where the error occurs is stored in the storage area which is difficult for any user to access, it becomes difficult for a user to change the image data, even though the user is authorized to change the image data. As a result, image data unwanted by the user is output.

Therefore, if an error occurs, the image data is saved in an accessible storage area so that an appropriate change can be made and the security of stored data can be retained by performing the processing procedures illustrated in FIGS. 8, 9, 10, and 12.

An external device may perform the above-described verification. Therefore, when the composite machine 1001 outputs image data of a job flow where an error occurs to an external device, such as the composite machine 1002, the external device can also perform the job flow with safety. Further, the addition and verification of an electronic signature can be performed without providing a special device used to confirm whether the job flow is changed.

Since the user is also warned when the job flow is expired, the user can determine whether the expired job flow should be performed. Subsequently, the user's convenience is enhanced.

According to the present embodiment, it is determined in step S8006 that at least the initial step (the first step) is finished. However, information about the type of a job flow for processing may be added, as the determination reference, to determine whether data to which an electronic signature should be added exists.

For example, it is determined whether the job flow corresponds to a soft button displayed after the "My Button" 7001 is selected, and/or it is determined whether the job flow corresponds to a soft button displayed after the common button 7002 is selected. Then, the job manager can determine the type of the job flow for processing. In other words, the type of the job flow for processing can be determined by determining whether the job flow is accessible only for a user who has logged in and/or determining whether the job flow is also accessible for a user other than the user who has logged in.

In that case, the electronic signature is generated when the job flow where an error occurs is accessible only for the user who has logged in. The electronic signature can be generated when the job flow is also accessible for a user other than the user who has logged in. However, there is a possibility that the job flow which is accessible only for the user who has logged in is changed by an outsider. Therefore, when the job flow where an error occurs is accessible only for a user who has logged in, the electronic signature may not be generated.

Information about what area data in the job flow where the error occurs is stored may be added as a determination reference. It may be determined whether data to which an electronic signature should be added exists. For example, the electronic signature may be generated when data in the job flow where the error occurs is stored in an area for which no access right is set, and the electronic signature may not be generated when the job flow is stored in an area for which an access right is set. Here, the area for which no access right is set is a shared box, i.e., a storage area that can be shared by a plurality of terminals. The area for which an access right is set is a personal box, i.e., a storage area that can be used only by a predetermined terminal. When data in the job flow where the error occurs is stored in an area which is not accessible for an external device, e.g., an image memory of a printer, the electronic signature may not be generated. Otherwise, the electronic signature may be generated.

Information about whether data on the job flow where the error occurs includes information about predetermined processing, e.g., acknowledgment processing, may be added as the determination reference. It may be determined whether there is data to which an electronic signature should be added. In that case, if the job flow where the error occurs includes information about the predetermined processing, e.g., the acknowledgment processing, the electronic signature may be generated. Otherwise, the electronic signature may not be generated.

It may be determined whether the electronic signature should be generated by combining all of the determination references added at step S8006. Or, it may be determined whether the electronic signature should be generated by adding a part, e.g., one of the determination references.

According to the present embodiment, when the job flow is expired, the dialog box 1100 showing the confirmation message is displayed to notify the user that the job flow is expired. However, the above-described notification may not be performed in the above-described manner. For example, it may be determined whether the image data of the job flow is changed without determining the expiration date of the job flow, and the dialog box 1100 showing the confirmation message may be displayed according to a result of the determination. Further, when the job flow is expired, the job flow may not be restarted without respect to the user's intention.

According to the present embodiment, it is determined in step 9004 whether the remaining steps of the job flow should be performed. If the remaining steps of the job flow should be performed, the remaining steps of the job flow are performed at step S9005. However, without being limited to the above-described embodiment, it may be determined whether the job flow should be executed from a predetermined step, e.g., the initial step, at step S9004, for example. If the job flow should be executed from the predetermined step, the job flow may be executed from the predetermined step at step S9005.

Figure 13:
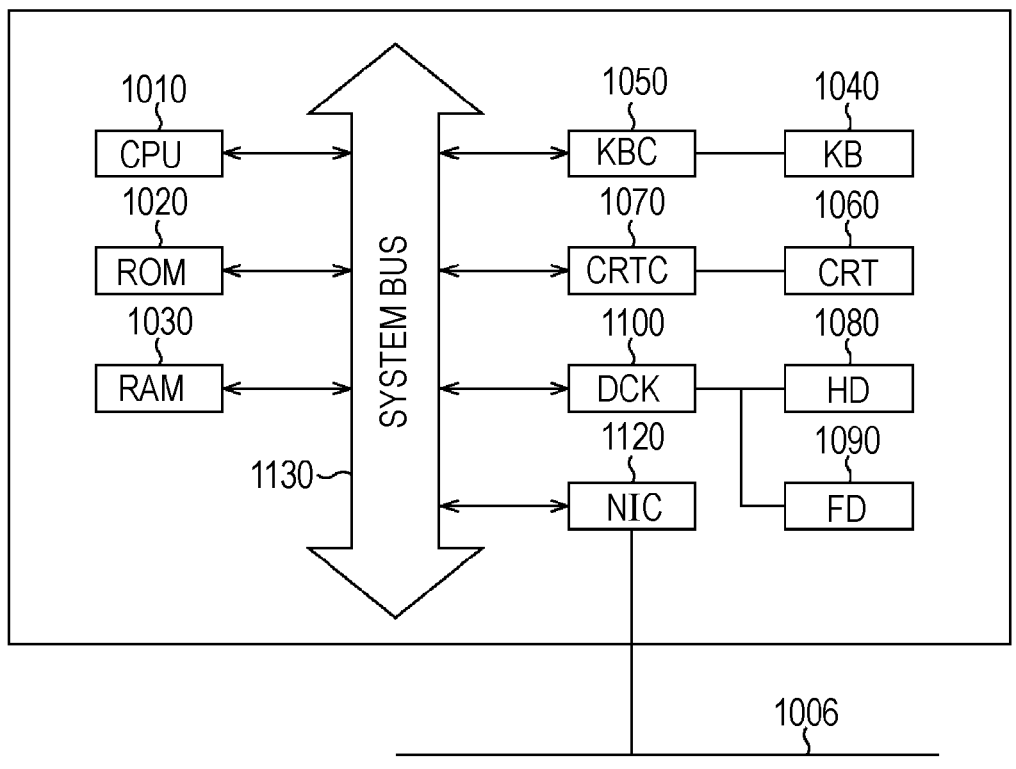
FIG. 13 is a block diagram illustrating an example of the configuration of each of a database/mail server and a client computer according to an embodiment of the present invention.

FIG. 13 is a block diagram illustrating an example configuration of each of the database/mail server 1004 and the client computer 1005.

In FIG. 13, a CPU 1010, a ROM 1020, a RAM 1030, and a keyboard controller (KBC) of a keyboard (KB) 1040 are connected to a system bus 1130. Further, a cathode-ray-tube controller (CRTC) 1070 of a cathode-ray-tube (CRT) display 1060 provided, as a display unit, is connected to the system bus 1130. Moreover, a disk controller (DKC) 1100 of a hard disk (HD) 1080 and a floppy disk (FD) 1090 are also connected to the system bus 1130. Further, a network-interface controller (NIC) 1120 used to connect to the LAN 1006 is also connected to the system bus 1130.

The CPU 1010 has centralized control over the above-described units connected to the system bus 1130 by executing software stored in the ROM 1020 and/or the HD 1080, and/or software supplied from the FD 1090.

The CPU 1010 performs control to achieve operations of the database/mail server 1004 and/or the client computer 10005 by reading a processing program generated according to a predetermined processing sequence from the ROM 1020, the HD 1080, or the FD 1090 and executing the read processing program.

The RAM 1030 functions as a main memory and/or a work area of the CPU 1010. The KBC 1050 controls inputting of an instruction issued from the KB 1040 and/or a pointing device (not shown).

The CRTC 1070 controls display processing performed by the CRT 1060. The DKC 1100 controls access to the HD 1080 and the FD 1090, where both the HD 1080 and the FD 1090 store a boot program, various types of applications, editing-file data, user-file data, a network-management program, a predetermined processing program according to the above-described embodiment, etc. The NIC 1120 transfers data bidirectionally between the database/mail server 1004 and/or the client computer 1005, and devices operating on the LAN 1006 and/or the system.

The above described processes have been executed as a result of selection of a button illustrated in FIG. 7. Now, an example where data for processing is submitted to a storage area where details on processing to be performed is determined in advance, as is the case with a hot folder, will be described. When performing the job flow by using the above-described storage area, the data for processing submitted to the storage area is input to the storage area, and the data for processing is processed according to the job flow set to the storage area. Further, the storage area stores the data for processing until the processing is finished in preparation for an error which occurs during the processing. The storage area is accessible for any user.

For example, assuming that a job flow having "editing step→printing step→FAX step" is registered with a first storage area, the job manager 4008 monitors whether data is input to the first storage area. If data for processing is input to the first storage area, the job flow set to the first storage area is executed. Here, details on each of steps of the job flow are determined in advance.

Thus, when the job manager 4008 executes a job flow when data for processing is input to a storage area and an error occurs during execution of the job flow, the data for processing input to the storage area remains in the storage area. In that case, a user different from a user who instructed execution of the job flow can access the storage area and change details on the data. The above-described problem can be solved by performing the processing procedures illustrated in FIGS. 8, 9, 10, and 12.

For example, a plurality of data items is combined during the editing processing of "editing step→printing step→FAX step" written, as the job flow set to the first storage area, and the combined data items are printed and transmitted by fax. If an error occurs during the printing step, the job manager 4008 generates an electronic signature by using the hash value of the combined data items and performs the processing procedures according to FIGS. 8, 9, 10, and 12.

Thus, in the above-described environment, data is input to a storage area having the same function as that of a hot folder and a job flow is executed according to the input data so that the data is processed. If an error occurs during execution of the job flow, data for processing remains in the storage area. However, even though the data for processing remaining in the storage area is subjected to undesired change processing, a user who instructed performance of the job flow can recognize that the undesired change processing is performed by executing the processing procedures illustrated in FIGS. 8, 9, 10, and 12. According to an embodiment of the present invention, even though an error occurs during execution of steps of a job flow, it becomes possible to store data obtained through steps that have already been performed with increased safety. That is, it becomes possible to prevent the performed steps from being wasted and to store data with increased safety.

Program code of software for implementing functions of the above-described embodiments may be supplied to a computer of an apparatus and/or a system connected to various devices, so as to operate the various devices for implementing the functions of the above-described embodiments. According to another embodiment of the present invention, the various devices may be operated according to a program stored in a computer (a CPU and/or a MPU) of the system and/or the apparatus.

In that case, the program code itself of the software achieves the functions of the above-described embodiments. Further, the program code itself and a medium for supplying the program code to the computer, such as a storage medium storing the program code constitute the present invention. The storage medium storing the program code may be a floppy disk, a hard disk, an optical disk, a magneto-optical disk, a compact disk (CD)-ROM, a magnetic tape, nonvolatile memory card, a ROM, etc.

Further, the functions of the above-described embodiments are achieved not only by the computer executing the transmitted program code, but also by the computer executing the transmitted program code in conjunction with an operating system, an application software program, etc. running on the computer. In that case, the program code also constitutes one of embodiments of the present invention.

The transmitted program code is stored in a memory provided in a function expansion board of the computer, and a CPU provided in the function expansion board executes part of or the entire actual processing according to instructions issued by the program code so that the functions of the above-described embodiments are achieved.

The transmitted program code can also be stored in a memory provided in a function expansion unit connected to the computer, and a CPU or the like of the function expansion unit executes part of or the entire actual processing according to instructions of the program code so that the functions of the above-described embodiments are achieved.

While the present invention has been described with reference to exemplary embodiments, it is to be understood that the technical scope of the present invention is not limited to the disclosed exemplary embodiments. That is to say, the scope of the following claims is to be accorded the broadest interpretation so as to encompass all modifications, equivalent structures and functions.

This application claims the benefit of Japanese Application No. 2006-252816 filed on Sep. 19, 2006, which is hereby incorporated by reference herein in its entirety.

What is claimed is:

1. A data-processing device comprising:
   an execution unit configured to execute processing for data to be processed based on details on the processing according to an instruction to perform a first job flow including a plurality of steps, where the details on the processing performed for the data to be processed are defined in the first job flow;
   a detection unit configured to detect occurrence of errors while the execution unit is performing the first job flow; and
   a storage unit configured to manage data processed at a step of the first job flow that has already been performed where an error has occurred by associating first validity-guarantee information with the data, wherein the first validity-guarantee information is used to guarantee validity of the data, and configured to store the data in a storage medium.

2. The data-processing device according to claim 1, further comprising a determination unit configured to determine whether at least an initial step of the plurality of steps included in the first job flow where the error occurs is completed when the detection unit detects the error occurrence,
   wherein when the determination unit determines that at least the initial step is completed, the storage unit manages the data processed at the step that has already been performed by associating the first validity-guarantee information with the data.

3. The data-processing device according to claim 1, wherein the validity-guarantee information includes information indicating a valid period of the first job flow and information which makes it possible to confirm whether the processed data is changed.

4. The data-processing device according to claim 1, wherein when the detection unit detects that an error occurs during execution of a second job flow, where the second job flow includes a plurality of steps, that can be executed by a first user, the storage unit manages data processed at a step of the second job flow that has already been executed by associating second validity-guarantee information with the data, wherein the second validity-guarantee information is used to guarantee validity of the data, and
   wherein when the detection unit detects that an error occurs during execution of a third job flow, where the third job flow includes a plurality of steps, that can be executed by a second user, the storage unit does not manage data processed at a step of the third job flow that has already been executed by associating third validity-guarantee information with the data, wherein the third validity-guarantee information is used to guarantee validity of the data.

5. The data-processing device according to claim 4, further comprising a determination unit configured to determine, when the detection unit detects that the error occurs in at least one of the second job flow and the third job flow, whether the at least one of the second job flow and the third job flow can be executed by a plurality of users based on an execution right set to a job flow where the error occurs,
   wherein when the determination unit determines that the job flow where an error is detected can be executed by the plurality of users, the storage unit manages data processed at a step that has already been executed by associating fourth validity-guarantee information with the data, wherein the fourth validity-guarantee information is used to guarantee validity of the data.

6. The data-processing device according to claim 1, wherein when the detection unit detects that an error occurs in a fourth job flow, wherein the fourth job flow includes a plurality of steps, set to a storage area accessible for an external device, the storage unit manages data processed at a step of the fourth job flow that has already been executed by associating fifth validity-guarantee information with the data, wherein the fifth validity-guarantee information is used to guarantee validity of the data, and
   wherein when data is input to an accessible storage area, the execution unit executes processing for the input data based on details on processing, wherein the details on processing being determined for the plurality of steps included in the fourth job flow.

7. The data-processing device according to claim 1, further comprising:
   a verification unit configured to verify, when the execution unit restarts the first job flow where the error is detected by the detection unit, the first validity-guarantee information associated with the data to be processed in the first job flow; and
   a display-control unit configured to, when the verification unit verifies that the data is changed, display information indicating that the data is changed.

8. The data-processing device according to claim 7, wherein the verification unit performs verification based on the first validity-guarantee information to determine whether a result of the verification corresponds to at least one of a first case where a time to restart the first job flow where the error is detected by the detection unit is past a valid period of the first job flow and a second case where the data is changed, and
   wherein when the result of the verification corresponds to the at least one of the first case and the second case, the display-control unit displays a warning-screen image to a user who has instructed restart of the first job flow.

9. The data-processing device according to claim 1, wherein the execution unit restarts the processing from a step in the first job flow where the error is detected.

10. A method for processing data, the method comprising:
    executing processing for data to be processed based on details on the processing according to an instruction to perform a job flow including a plurality of steps, where the details on the processing performed for the data to be processed are defined in the job flow;
    detecting occurrence of an error during execution of the job flow; and
    managing data processed at a step of the plurality of steps that has already been performed where an error has occurred by associating validity-guarantee information with the data, wherein the validity-guarantee information is used to guarantee validity of the data; and
    storing the data in a storage medium.

11. A non-transitory computer-executable storage medium storing computer-executable process steps, the computer-executable process steps causing a computer to execute the method of claim 10.

* * * * *